United States Patent
Wang et al.

(10) Patent No.: US 12,071,365 B2
(45) Date of Patent: Aug. 27, 2024

(54) GLASS ASSEMBLY INCLUDING A PERFORMANCE-ENHANCING FEATURE AND METHOD OF MANUFACTURING THEREOF

(71) Applicant: AGC Automotive Americas Co., Alpharetta, GA (US)

(72) Inventors: Jiangping Wang, Novi, MI (US); Timothy D. Peck, White Lake, MI (US); Samuel Thomas Machi, Belleville, MI (US); Joel Smith, Battle Creek, MI (US); Brandon Jones, Ypsilanti, MI (US); Frederick Maurice Schaible, III, Ann Arbor, MI (US); Abdelhalim Mohamed, Canton, MI (US); Christopher A. Imeson, Lasalle (CA)

(73) Assignee: AGC Automotive Americas Co., Alpharetta, GA (US)

( * ) Notice: Subject to any disclaimer, the term of this patent is extended or adjusted under 35 U.S.C. 154(b) by 38 days.

(21) Appl. No.: 17/860,411

(22) Filed: Jul. 8, 2022

(65) Prior Publication Data

US 2024/0010549 A1    Jan. 11, 2024

(51) Int. Cl.
*C03C 17/00* (2006.01)
*B32B 17/10* (2006.01)
(Continued)

(52) U.S. Cl.
CPC ...... *C03C 17/001* (2013.01); *B32B 17/10036* (2013.01); *B32B 17/10266* (2013.01);
(Continued)

(58) Field of Classification Search
CPC ..... Y02A 40/81; B32B 1/00; B32B 17/10036; B32B 17/10266; B32B 17/10293;
(Continued)

(56) References Cited

U.S. PATENT DOCUMENTS

| 4,668,270 A | 5/1987 | Ramus |
| 4,744,844 A | 5/1988 | Hurst |

(Continued)

FOREIGN PATENT DOCUMENTS

| CN | 106335291 A | 1/2017 |
| CN | 114531874 A | 5/2022 |

(Continued)

OTHER PUBLICATIONS

Do It Yourself Window Tinting (Year: 2024).*
(Continued)

*Primary Examiner* — Sonya M Sengupta
(74) *Attorney, Agent, or Firm* — Howard & Howard Attorneys PLLC

(57) ABSTRACT

A method of manufacturing a glass assembly to have a performance-enhancing feature includes a step of forming a glass substrate that is curved. The method also includes digitally-applying an ink without a mask onto a surface of the curved glass substrate. The method further includes curing the ink to form the performance-enhancing feature on the surface of the curved glass substrate.

30 Claims, 29 Drawing Sheets

(51) Int. Cl.
*B32B 37/24* (2006.01)
*B32B 38/00* (2006.01)
*C03C 17/32* (2006.01)

(52) U.S. Cl.
CPC .. *B32B 17/10293* (2013.01); *B32B 17/10348* (2013.01); *B32B 17/10385* (2013.01); *B32B 17/10935* (2013.01); *B32B 37/24* (2013.01); *B32B 38/145* (2013.01); *C03C 17/32* (2013.01); *B32B 2037/243* (2013.01); *B32B 2250/03* (2013.01); *B32B 2255/26* (2013.01); *B32B 2307/202* (2013.01); *B32B 2307/412* (2013.01); *B32B 2310/0831* (2013.01); *B32B 2315/08* (2013.01); *B32B 2457/00* (2013.01); *B32B 2605/006* (2013.01); *B32B 2605/08* (2013.01); *C03C 2217/732* (2013.01); *C03C 2217/75* (2013.01); *C03C 2217/76* (2013.01); *C03C 2218/119* (2013.01); *C03C 2218/32* (2013.01)

(58) Field of Classification Search
CPC ........ B32B 17/10348; B32B 17/10385; B32B 17/10761; B32B 17/1077; B32B 17/10788; B32B 17/10889; B32B 17/10935; B32B 2037/243; B32B 2250/03; B32B 2255/26; B32B 2307/202; B32B 2307/4023; B32B 2307/41; B32B 2307/412; B32B 2307/7376; B32B 2310/0831; B32B 2315/08; B32B 2457/00; B32B 2605/006; B32B 2605/08; B32B 27/30; B32B 27/306; B32B 27/40; B32B 3/08; B32B 37/24; B32B 38/145; B32B 7/12; C03C 17/001; C03C 17/32; C03C 2217/732; C03C 2217/75; C03C 2217/76; C03C 2218/119; C03C 2218/31; C03C 2218/32; C03C 2218/365; C03C 27/10

See application file for complete search history.

(56) References Cited

U.S. PATENT DOCUMENTS

| | | | |
|---|---|---|---|
| 4,786,784 A | 11/1988 | Nikodem et al. | |
| RE33,297 E | 8/1990 | Ramus et al. | |
| 5,565,237 A | 10/1996 | Bartetzko | |
| 6,602,371 B2 | 8/2003 | Veerasamy | |
| 7,132,625 B2 | 11/2006 | Voeltzel | |
| 7,727,634 B2 | 6/2010 | Yacovone | |
| 7,803,221 B2 | 9/2010 | Magdassi et al. | |
| 7,955,470 B2 | 6/2011 | Kapp et al. | |
| 7,955,696 B2 | 6/2011 | Baikerikar et al. | |
| 8,022,333 B2 | 9/2011 | Maeuser | |
| 9,011,628 B2 | 4/2015 | Elwakil et al. | |
| 9,090,120 B2 | 7/2015 | Pires et al. | |
| 9,158,172 B2* | 10/2015 | Sbar | G02F 1/153 |
| 9,434,132 B2 | 9/2016 | Van Duffel et al. | |
| 9,556,071 B2 | 1/2017 | Finley et al. | |
| 9,623,634 B2 | 4/2017 | Mannheim Astete et al. | |
| 9,630,396 B2 | 4/2017 | Orr | |
| 9,790,388 B2 | 10/2017 | Wang et al. | |
| 9,986,669 B2 | 5/2018 | Uprety et al. | |
| 10,232,592 B2 | 3/2019 | Loccufier et al. | |
| 10,278,237 B2 | 4/2019 | Krause et al. | |
| 10,374,330 B1 | 8/2019 | Bennett et al. | |
| 10,420,210 B2 | 9/2019 | Uprety et al. | |
| 10,549,508 B2 | 2/2020 | Cloots et al. | |
| 10,553,964 B2 | 2/2020 | Bennett et al. | |
| 10,752,782 B2 | 8/2020 | Loccufier | |
| 10,792,955 B2* | 10/2020 | Ito | B32B 27/365 |
| 10,819,002 B2 | 10/2020 | Zhu et al. | |
| 10,843,497 B2 | 11/2020 | Minamidate et al. | |
| 10,882,780 B2 | 1/2021 | Conti et al. | |
| 11,027,528 B2 | 6/2021 | Laluet et al. | |
| 11,031,671 B2 | 6/2021 | Xia et al. | |
| 11,075,450 B2 | 7/2021 | Yong et al. | |
| 11,097,978 B2 | 8/2021 | Hori et al. | |
| 11,130,314 B2 | 9/2021 | Yoon et al. | |
| 11,260,629 B2 | 3/2022 | Cleary et al. | |
| 11,279,108 B2 | 3/2022 | Bard et al. | |
| 11,362,473 B2 | 6/2022 | Yeh | |
| 11,654,751 B2 | 5/2023 | Wetzel et al. | |
| 11,679,597 B2 | 6/2023 | Büstgens | |
| 11,752,778 B2 | 9/2023 | Hasegawa | |
| 2008/0152926 A1* | 6/2008 | Baikerikar | H01B 1/22 427/493 |
| 2008/0206504 A1 | 8/2008 | Hayes et al. | |
| 2008/0233371 A1 | 9/2008 | Hayes et al. | |
| 2008/0286542 A1 | 11/2008 | Hayes et al. | |
| 2010/0098917 A1 | 4/2010 | Lyon | |
| 2013/0258436 A1 | 10/2013 | Podbelski et al. | |
| 2015/0101849 A1 | 4/2015 | Bockmeyer et al. | |
| 2015/0375246 A1 | 12/2015 | Kalistaja et al. | |
| 2016/0185101 A1 | 6/2016 | Lee et al. | |
| 2016/0297222 A1 | 10/2016 | Allington et al. | |
| 2017/0342282 A1 | 11/2017 | Torfs et al. | |
| 2018/0257978 A1 | 9/2018 | Minamidate et al. | |
| 2018/0311892 A1 | 11/2018 | Abbott, Jr. et al. | |
| 2019/0381786 A1 | 12/2019 | Watanabe | |
| 2020/0122436 A1 | 4/2020 | Mannheim Astete et al. | |
| 2020/0171800 A1* | 6/2020 | Cleary | B32B 17/10266 |
| 2020/0215796 A1 | 7/2020 | Butler et al. | |
| 2020/0239358 A1 | 7/2020 | Urata et al. | |
| 2020/0290318 A1 | 9/2020 | Mannheim Astete et al. | |
| 2020/0310014 A1 | 10/2020 | Bard et al. | |
| 2020/0391577 A1 | 12/2020 | Bard et al. | |
| 2020/0392358 A1 | 12/2020 | Courtet et al. | |
| 2021/0078299 A1 | 3/2021 | Keller | |
| 2021/0178799 A1 | 6/2021 | Cofler et al. | |
| 2021/0237540 A1 | 8/2021 | Kojima et al. | |
| 2021/0394488 A1 | 12/2021 | Sadakane et al. | |
| 2022/0176681 A1 | 6/2022 | Voss | |
| 2023/0191753 A1 | 6/2023 | Jamart | |
| 2023/0211587 A1 | 7/2023 | Tu et al. | |
| 2023/0226987 A1 | 7/2023 | He et al. | |
| 2024/0010549 A1* | 1/2024 | Wang | B32B 17/10036 |

FOREIGN PATENT DOCUMENTS

| | | |
|---|---|---|
| CN | 114765970 A | 7/2022 |
| CN | 114981225 A | 8/2022 |
| CN | 113682113 B | 11/2022 |
| CN | 111470781 B | 1/2023 |
| CN | 116766891 A | 9/2023 |
| EP | 2060546 A1 | 5/2009 |
| EP | 2168774 B1 | 2/2011 |
| EP | 2436527 A2 | 4/2012 |
| EP | 3034312 A1 | 6/2016 |
| EP | 2054352 B1 | 1/2019 |
| EP | 1644295 B1 | 8/2020 |
| EP | 3549389 B1 | 2/2021 |
| EP | 3799587 A1 | 4/2021 |
| EP | 3515654 B1 | 6/2021 |
| FR | 2750419 A1 | 1/1998 |
| JP | 2003017171 A | 1/2003 |
| JP | 2015076407 A | 4/2015 |
| JP | 2018538222 A | 12/2018 |
| JP | 7295115 B2 | 6/2023 |
| KR | 20130059644 A | 6/2013 |
| WO | 9118757 A1 | 12/1991 |
| WO | 2012022904 A1 | 2/2012 |
| WO | 2012028820 A1 | 3/2012 |
| WO | 2021084279 A1 | 5/2021 |
| WO | 2021090243 A1 | 5/2021 |
| WO | 2021094625 A1 | 5/2021 |
| WO | 2021105422 A1 | 6/2021 |
| WO | 2021110723 A1 | 6/2021 |
| WO | 2021204551 A1 | 10/2021 |
| WO | 2021209433 A1 | 10/2021 |
| WO | 2021220206 A1 | 11/2021 |
| WO | 2021233703 A1 | 11/2021 |

(56) References Cited

FOREIGN PATENT DOCUMENTS

| WO | 2021233807 A1 | 11/2021 |
|---|---|---|
| WO | 2022057951 A1 | 3/2022 |
| WO | 2023285743 A1 | 1/2023 |
| WO | 2023020933 A1 | 2/2023 |
| WO | 2023058617 A1 | 4/2023 |
| WO | 2023058618 A1 | 4/2023 |
| WO | 2023146762 A1 | 8/2023 |

OTHER PUBLICATIONS

How to Tint Car Windows (Year: 2022).*
UV LED Printing for Automotive Applications (Year: 2022).*
https://www.youtube.com/watch?v=VjQQ0bUDvH4 (Year: 2013).*
Translation of CN 111386192.*
Translation of EP 4303198.*
English language abstract and machine-assisted English translation for CN 1106335291 A extracted from espacenet.com database on Jul. 13, 2022, 9 pages.
English language abstract for EP 1 644 295 B1 and machine-assisted English translation for equivalent WO 2005/003048 A1 extracted from espacenet.com database on Jul. 13, 2022, 12 pages.
English language abstract for EP 3 515 654 B1 extracted from espacenet.com database on Jul. 13, 2022, 2 pages.
English language abstract and machine-assisted English translation for JP 2003-017171 A extracted from espacenet.com database on Jul. 13, 2022, 12 pages.
English language abstract and machine-assisted English translation for WO 2012/022904 A1 extracted from espacenet.com database on Jul. 13, 2022, 10 pages.
English language abstract and machine-assisted English translation for WO 2012/028820 A1 extracted from espacenet.com database on Jul. 13, 2022, 22 pages.
English language abstract and machine-assisted English translation for WO 2021/105422 A1 extracted from espacenet.com database on Jul. 13, 2022, 13 pages.
English language abstract and machine-assisted English translation for WO 2021/204551 A1 extracted from espacenet.com database on Jul. 13, 2022, 23 pages.
English language abstract and machine-assisted English translation for WO 2021/209433 A1 extracted from espacenet.com database on Jul. 13, 2022, 19 pages.
English language abstract and machine-assisted English translation for WO 2021/233703 A1 xtracted from espacenet.com database on Jul. 13, 2022, 9 pages.
English language abstract and machine-assisted English translation for WO 2022/057951 A1 extracted from espacenet.com database on Jul. 13, 2022, 16 pages.
The Usglass News Network (USGNN), "NSG Group and University of Cambridge Sowing Seeds for Future Glass Applications", https://www.usglassmag.com/2020/10/nsg-group-and-university-of-cambridge-sowing-seeds-for-future-glass-applications/, Oct. 23, 2020, 2 pages.
U.S. Appl. No. 17/860,296, filed Jul. 8, 2022.
U.S. Appl. No. 17/860,488, filed Jul. 8, 2022.
U.S. Appl. No. 17/860,576, filed Jul. 8, 2022.
English language abstract and machine-assisted English translation for FR 2 750 419 A1 extracted from espacenet.com database on Nov. 7, 2023, 6 pages.
English language abstract and machine-assisted English translation for KR 20130059644 A extracted from espacenet.com database on Nov. 7, 2023, 10 pages.
English language abstract and machine-assisted English translation for CN 114531874 A extracted from espacenet.com database on Oct. 27, 2023, 26 pages.
English language abstract and machine-assisted English translation for CN 114765970 A extracted from espacenet.com database on Oct. 27, 2023, 16 pages.
English language abstract and machine-assisted English translation for CN 114981225 A extracted from espacenet.com database on Oct. 27, 2023, 22 pages.
English language abstract and machine-assisted English translation for CN 113682113 B extracted from espacenet.com database on Oct. 27, 2023, 13 pages.
English language abstract and machine-assisted English translation for CN 111470781 B extracted from espacenet.com database on Oct. 27, 2023, 14 pages.
English language abstract and machine-assisted English translation for CN 116766891 A extracted from espacenet.com database on Oct. 27, 2023, 17 pages.
English language abstract for JP 7295115 B2 extracted from espacenet.com database on Oct. 27, 2023, 2 pages.
English language abstract and machine-assisted English translation for WO 2023/285743 A1 extracted from espacenet.com database on Oct. 27, 2023, 11 pages.
English language abstract and machine-assisted English translation for WO 2023/020933 A1 extracted from espacenet.com database on Oct. 27, 2023, 12 pages.
English language abstract and machine-assisted English translation for WO 2023/058617 A1 extracted from espacenet.com database on Oct. 27, 2023, 26 pages.
English language abstract and machine-assisted English translation for WO 2023/058618 A1 extracted from espacenet.com database on Oct. 27, 2023, 29 pages.
English language abstract for JP 2015-076407 A extracted from espacenet.com database on Jun. 19, 2024, 2 pages.
English language abstract for JP 2018-538222 A extracted from espacenet.com database on Jun. 19, 2024, 2 pages.

* cited by examiner

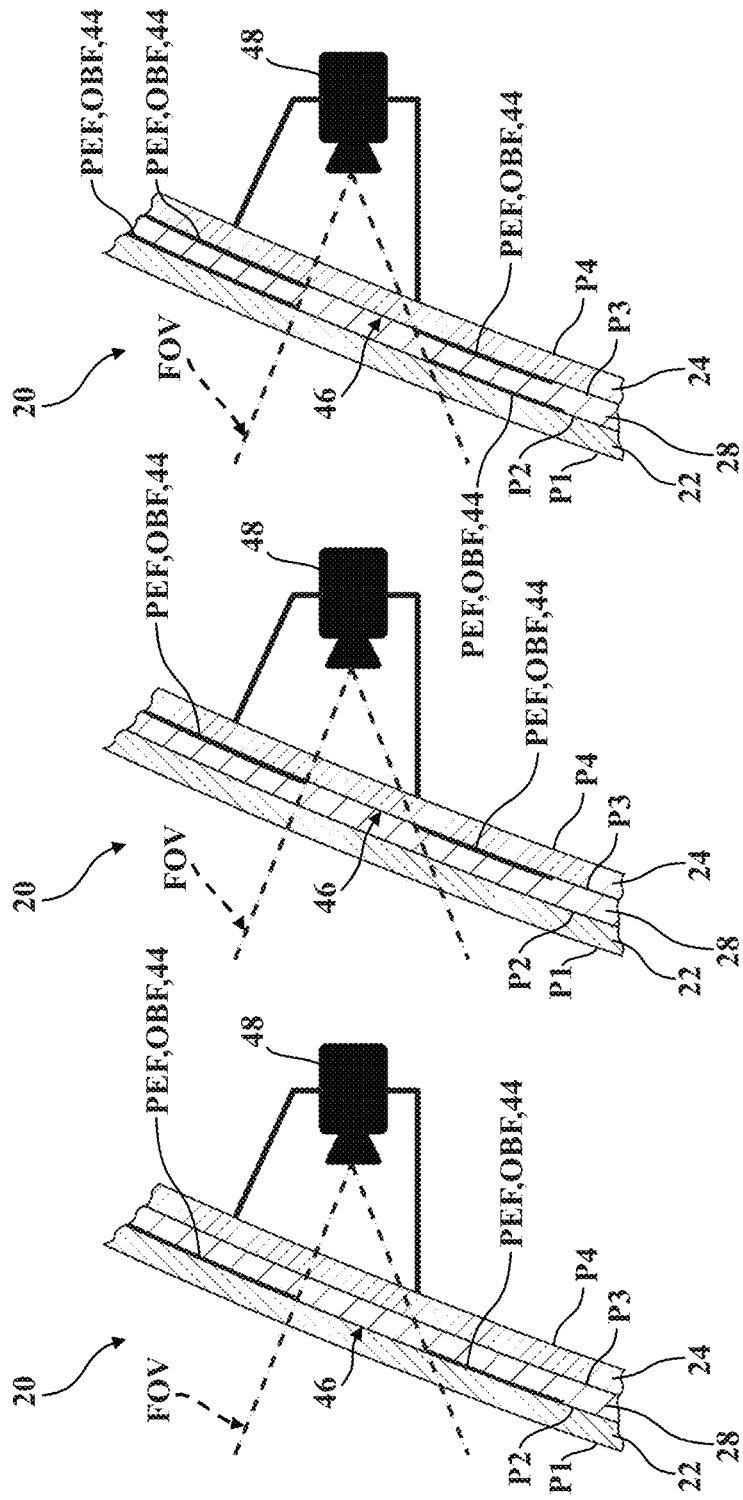

GLASS ASSEMBLY INCLUDING A PERFORMANCE-ENHANCING FEATURE AND METHOD OF MANUFACTURING THEREOF

TECHNICAL FIELD

The present disclosure relates generally to glass assemblies and methods of manufacturing glass assemblies, and more specifically to glass assemblies including a performance-enhancing feature and methods of manufacturing glass assemblies to include the performance-enhancing feature.

BACKGROUND

Glass assemblies used in automotive contexts often include performance-enhancing features. Typically, these performance-enhancing features include a substance deposited on the glass assembly to add additional functionality to the glass assembly and/or improve the aesthetic appearance of the glass assembly. Examples of performance-enhancing features include conductive features (such as heating grids or antennas), opaque boundary features (such as black bands or optical sensor boundaries), or other functional coatings (such as anti-reflective coatings, IR transparent coatings, hydrophobic coatings, oleophobic coatings, or oleophilic coatings). Often, performance-enhancing features are formed by depositing a substance (such as a mixture of ceramic frit and other substances, such as pigments or conductive particles) onto a flat glass substrate and subsequently firing the glass substrate at temperatures in excess of 500 degrees Celsius to fuse the substance into the glass. The glass substrate including the fused substance is typically fired at temperatures in excess of 600 degrees Celsius to bend the substrate into a desired shape. Problematically, when glass assemblies including these substances are fired at these high temperatures, the portion of the glass assembly including the substance absorbs heat differently than the rest of the glass assembly which does not include the substance. For example, the portion of the glass assembly including the substance is at a temperature of 650 degrees Celsius during firing, while the rest of the glass assembly (not including the substance) is at a temperature of 640 degrees Celsius during firing. Accordingly, the portion of the glass assembly including the substance will have a softness that is different than the softness of the rest of the glass assembly which does not include the substance. The different softness of the portion of the glass assembly including the substance and the softness of the rest of the glass assembly causes each portion of the glass assembly to deform differently, thereby causing significant optical distortion of the glass assembly and affecting the strength of the glass assembly. This optical distortion has a particularly adverse effect on the performance of optical sensors used for semi-autonomous or autonomous driving, including cameras and LIDAR sensors.

Additionally, conventional analog printing processes (e.g. screen-printing, spray-printing with a mask, and the like) for depositing substances are generally limited to a maximum resolution of about 200 dots per inch and typically require a mask. As an example, in a conventional screen-printing process, a mask (i.e., a "screen") defining voids corresponding to a desired area to be printed is arranged over a substrate. The substance is deposited over the mask in a manual process, such as with a roller, squeegee, brush, spray, or the like. These manual processes often require depositing an excess of the substance over the mask to ensure that all of the voids of the mask are adequately filled. Furthermore, conventional analog printing processes are typically carried out on flat substrates because it is a challenge to accurately and repeatably print onto a curved substrate.

In view of the above, there is a need for an improved method of manufacturing a glass assembly having a performance-enhancing feature.

SUMMARY

The present disclosure includes a method of manufacturing a glass assembly to have a performance-enhancing feature (PEF). The method includes forming a glass substrate that is curved. The method also includes digitally-applying an ink without a mask onto a surface of the curved glass substrate. The method also includes curing the ink to form the PEF on the surface of the curved glass substrate. Advantageously, by digitally-applying the ink after forming the curved glass substrate, the optical distortion caused by firing a glass assembly including conventional substances is prevented. Furthermore, due to the precise control afforded by digitally-applying the ink, the ink is deposited with significantly tighter tolerances and may form significantly more detailed features than conventional analog printing processes.

BRIEF DESCRIPTION OF THE DRAWINGS

Advantages of the present disclosure will be readily appreciated as the same becomes better understood by reference to the following detailed description when considered in connection with the accompanying drawings.

FIGS. 10A-10C are cross-sectional schematic representations of examples of the glass assembly of FIG. 7 taken along line 10-10 including an opaque boundary feature formed as an optical sensor boundary.

DETAILED DESCRIPTION

Figure 1:
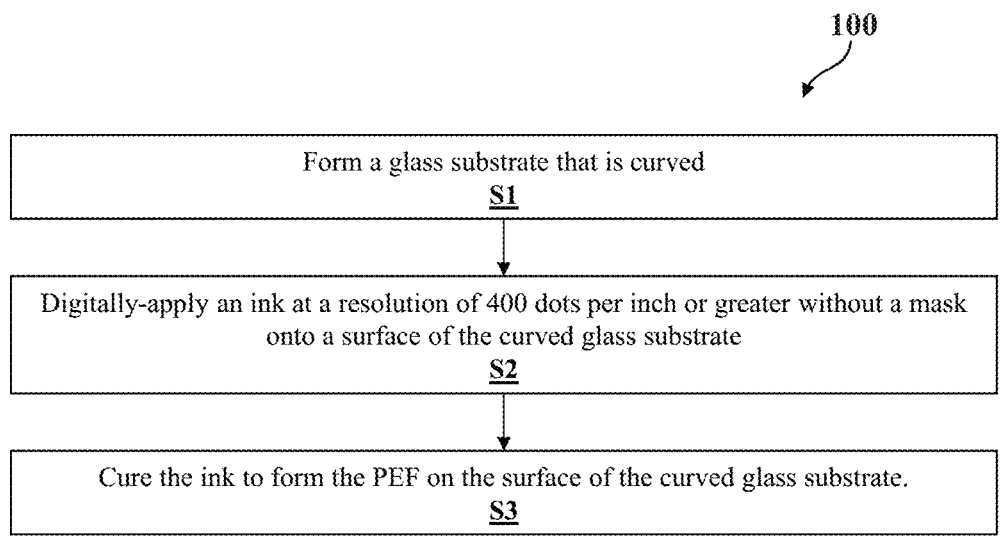
FIG. 1 is a flowchart illustrating the method of the present disclosure.

Referring to the drawings, wherein like reference numerals are used to identify like or identical components in the various views, FIG. 1 schematically illustrates a method 100 of forming a glass assembly 20 to have a performance-enhancing feature PEF. In one example, the glass assembly 20 is used in an automotive context as a window for a vehicle 18, such as a windshield, side window, quarter window, rear window, and the like. Of course, it is to be appreciated that the method 100 of forming the glass assembly 20 can be outside the automotive context.

Referring to FIGS. 1-3B, the method 100 of forming a glass assembly 20 includes the steps of: step S1 of forming a glass substrate 22 that is curved, step S2 of digitally-applying an ink I without a mask onto a surface of the curved glass substrate 22, and step S3 of curing the ink I to form the performance-enhancing feature PEF on the surface of the curved glass substrate 22. Description of each of the steps S1, S2, S3, S4 of the method 100 is included in further detail below.

Figure 2:
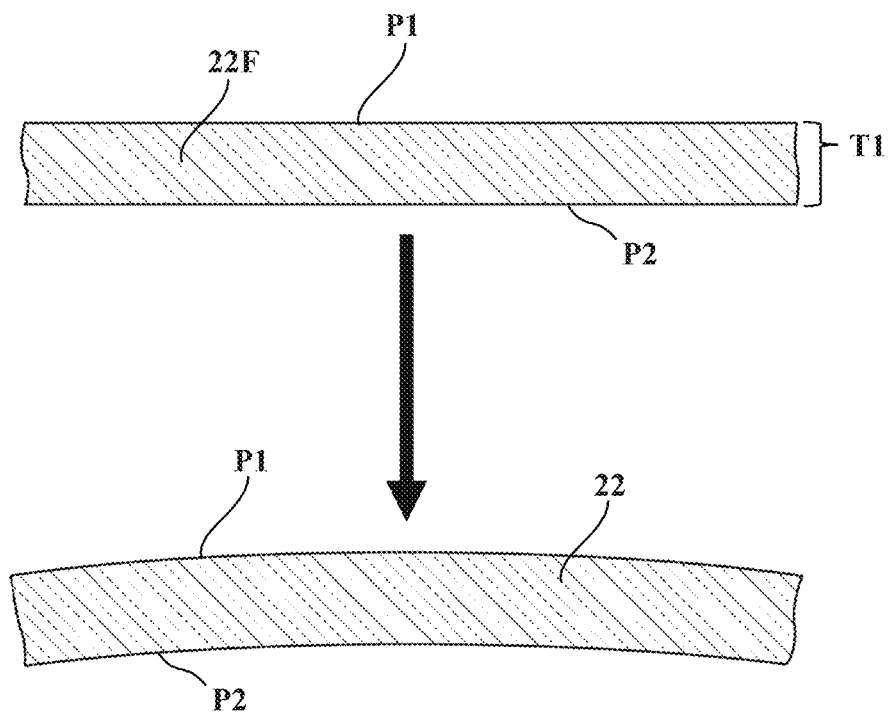
FIG. 2 is a cross-sectional schematic representation of a step of forming a glass substrate that is curved.

As described above, step S1 of the method 100 includes forming a glass substrate 22 that is curved. Referring to FIG. 2, the curved glass substrate 22 may be formed to have an outer surface (P1) and an opposing inner surface (P2). In one example, the P2 surface is arranged to face the interior of the vehicle 18 when the glass assembly 20 is installed in the vehicle 18, and the P1 surface is arranged to face outward from the vehicle 18 when the glass assembly 20 is installed in the vehicle 18.

With continued reference to FIG. 2, in one example of step S1, the curved glass substrate 22 is initially formed as a flat glass sheet 22F. The flat glass sheet 22F may be produced using any suitable flat glass manufacturing process including, but not limited to, a float process. The flat glass sheet 22F may be comprised of any suitable glass composition including, but not limited to, soda-lime glass, aluminosilicate glass, borosilicate glass, boro-aluminosilicate glass, and the like.

After the formation of the flat glass sheet 22F, the flat glass sheet 22F is bent to form the curved glass substrate 22. The flat glass sheet 22F may be bent using any suitable glass bending process including, but not limited to, press bending, gravity bending (i.e., sag bending), roll forming, or cold bending. The flat glass sheet 22F may be bent into any geometry suitable for the desired application.

In other examples of step S1, the curved glass substrate 22 is formed as a curved substrate at the outset, as opposed to producing and subsequently bending the flat glass sheet 22F. The curved glass substrate 22 may be produced using any suitable curved glass manufacturing process including, but not limited to, glass blow molding. Similar to the flat glass sheet 22F described above, in this example, where the curved glass substrate 22 is formed at the outset, the curved glass substrate 22 may be comprised of any suitable glass composition including, but not limited to, soda-lime glass, aluminosilicate glass, borosilicate glass, boro-aluminosilicate glass, and the like.

In some examples, the glass assembly 20 is formed as a laminated glass assembly 20. In these examples, the laminated glass assembly 20 includes the curved glass substrate 22 (also referred to as "the first curved glass substrate 22") having the outer surface (P1) and the opposing inner surface (P2), a second curved glass substrate 24 having an inner surface (P3) and an opposing outer surface (P4), and a polymeric interlayer 28 disposed between the P2 surface and the P3 surface (described in further detail below). Accordingly, in the context of laminated glass assemblies 20, step S1 of the method 100 may further include forming a second glass substrate 24 that is curved. It should be appreciated that the second curved glass substrate 24 may be formed according to any of the processes described above regarding the first curved glass substrate 22. It should also be appreciated that the first curved glass substrate 22 and the second curved glass substrate 24 may be formed together (i.e., bent while disposed adjacent to each other) or separately. Similar to the first curved glass substrate 22, the second curved glass substrate 24 may be comprised of any suitable glass composition including, but not limited to, soda-lime glass, aluminosilicate glass, borosilicate glass, boro-aluminosilicate glass, and the like. The first curved glass substrate 22 and the second curved glass substrate 24 may be comprised of the same or different glass compositions.

Advantageously, during the bending process, the first curved glass substrate 22 and/or the second curved glass substrate 24 may be free of conventional substances (such as coatings including ceramic frit) used to form performance-enhancing features that are subject to firing, especially on portions of the glass assembly 20 where minimizing distortion is critical (e.g. the field of view of an optical sensor). Accordingly, the first curved glass substrate 22 and/or the second curved glass substrate 24 absorb heat more uniformly than substrates including these conventional substances, thereby preventing uneven deformation (i.e., optical distortion) of the first curved glass substrate 22 and/or the second curved glass substrate 24. Instead, as described below in the context of step S2 and S3, an ink I is applied to and cured on a surface of the first curved glass substrate 22 and/or the second curved glass substrate 24 to form the performance-enhancing feature PEF after step S1.

In some examples, the first curved glass substrate 22 and/or the second curved glass substrate 24 are transparent. In this context, the term "transparent", also referred to as "substantially transparent", refers to a material that allows 70% or more of light transmission in a predefined visible light range to travel therethrough. Unless otherwise indicated, the predefined visible light range is the segment of the electromagnetic spectrum that the human eye can view. More simply, this range of wavelengths is called visible light. Typically, the human eye can detect wavelengths from about 380 to about 780 nanometers, and thus the predefined visible light range as defined herein refers to wavelengths of light from about 380 to about 780 nanometers unless otherwise indicated. In some examples, the first curved glass substrate 22 and/or the second curved glass substrate 24 include various additives to alter the transmissivity of the curved glass substrate; for example, additives may provide various levels of tint or coloration while still maintaining the first curved glass substrate 22 and/or the second curved glass substrate 24 as "transparent" or "substantially transparent" as described above.

In other examples, the first curved glass substrate 22 and/or the second curved glass substrate 24 are less transparent than described above. For example, where the glass assembly 20 is a privacy glass, the transparency of the glass assembly 20 is substantially reduced, and thus the glass assembly 20 allows less than 70% light transmission in a predefined wavelength range, such as from greater than 0 to 70% light transmission at the predefined wavelength range.

The curved glass substrate 22 has a thickness T1. The thickness T1 of the curved glass substrate 22 may be any suitable thickness for the application. For example, in automotive window applications, the thickness T1 of the curved glass substrate 22 may be from about 0.3 mm to about 4.1 mm. More specifically, the thickness T1 may be about 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm. 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, or 4.1 mm.

Similarly, in the context of the laminated glass assemblies 20, the second curved glass substrate 24 has a thickness T2. The thickness T2 of the second curved glass substrate 24 may be any suitable thickness for the application. For example, in automotive laminate applications, the thickness T2 of the second curved glass substrate 24 may be from about 0.3 mm to about 4.1 mm. More specifically, the thickness T2 may be about 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm. 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, or 4.1 mm. It should be appreciated that the thickness T1 and the thickness T2 can be the same or different. In one example, the first curved glass substrate 22 and the second curved glass substrate 24 have the same thickness (i.e., where T1 is equal to T2) such that the glass assembly 20 is considered a "symmetric" laminate. However, in another example, the first curved glass substrate 22 and the second curved glass substrate 24 have different thicknesses (i.e., where T1 is not equal to T2) such that the glass assembly 20 is considered an "asymmetric" laminate. All combinations of the example T1 and T2 values listed above and all fractional values therebetween are contemplated.

Figure 3A:
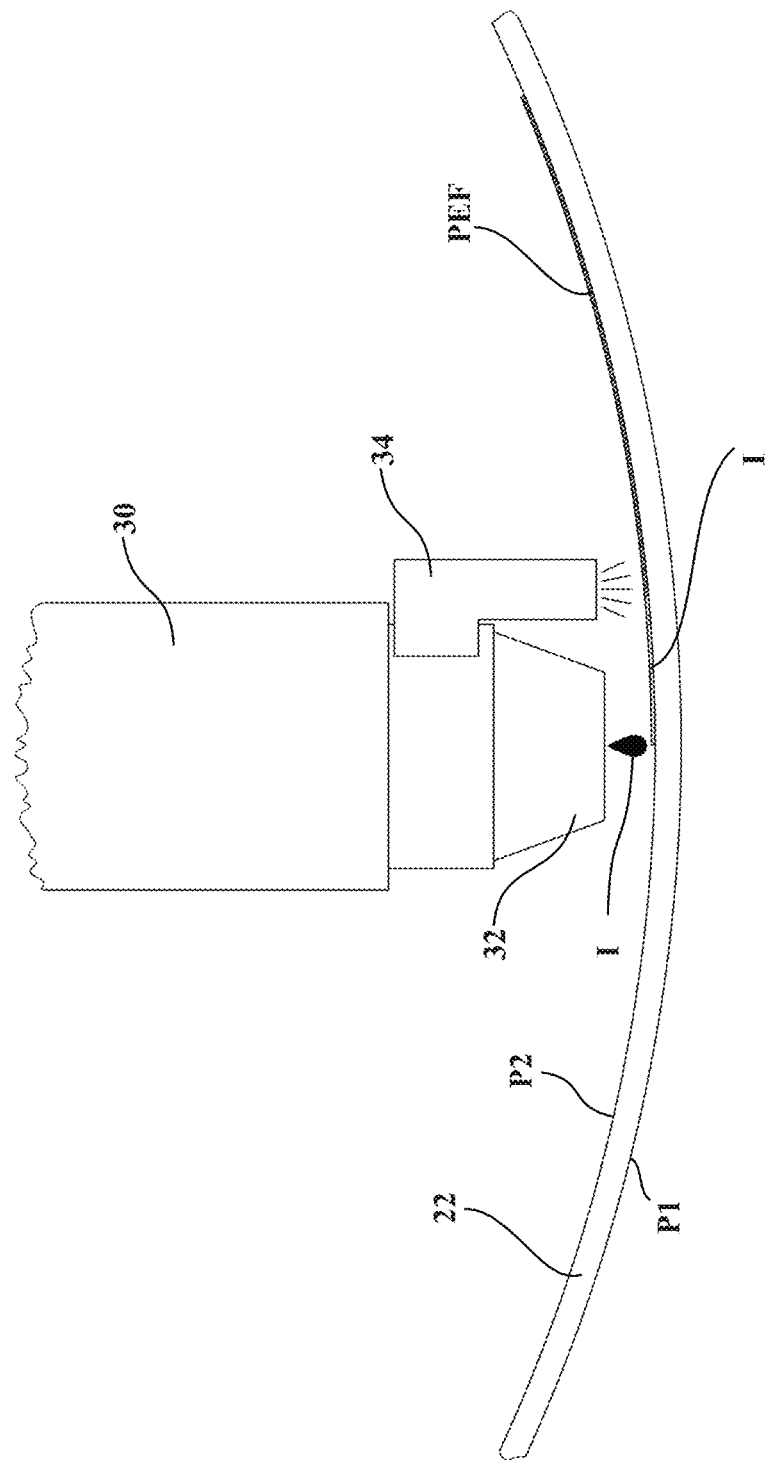
FIG. 3A is a front schematic representation of the steps of digitally-applying an ink onto the curved glass substrate and curing the ink to form a performance-enhancing feature.
Figure 3B:
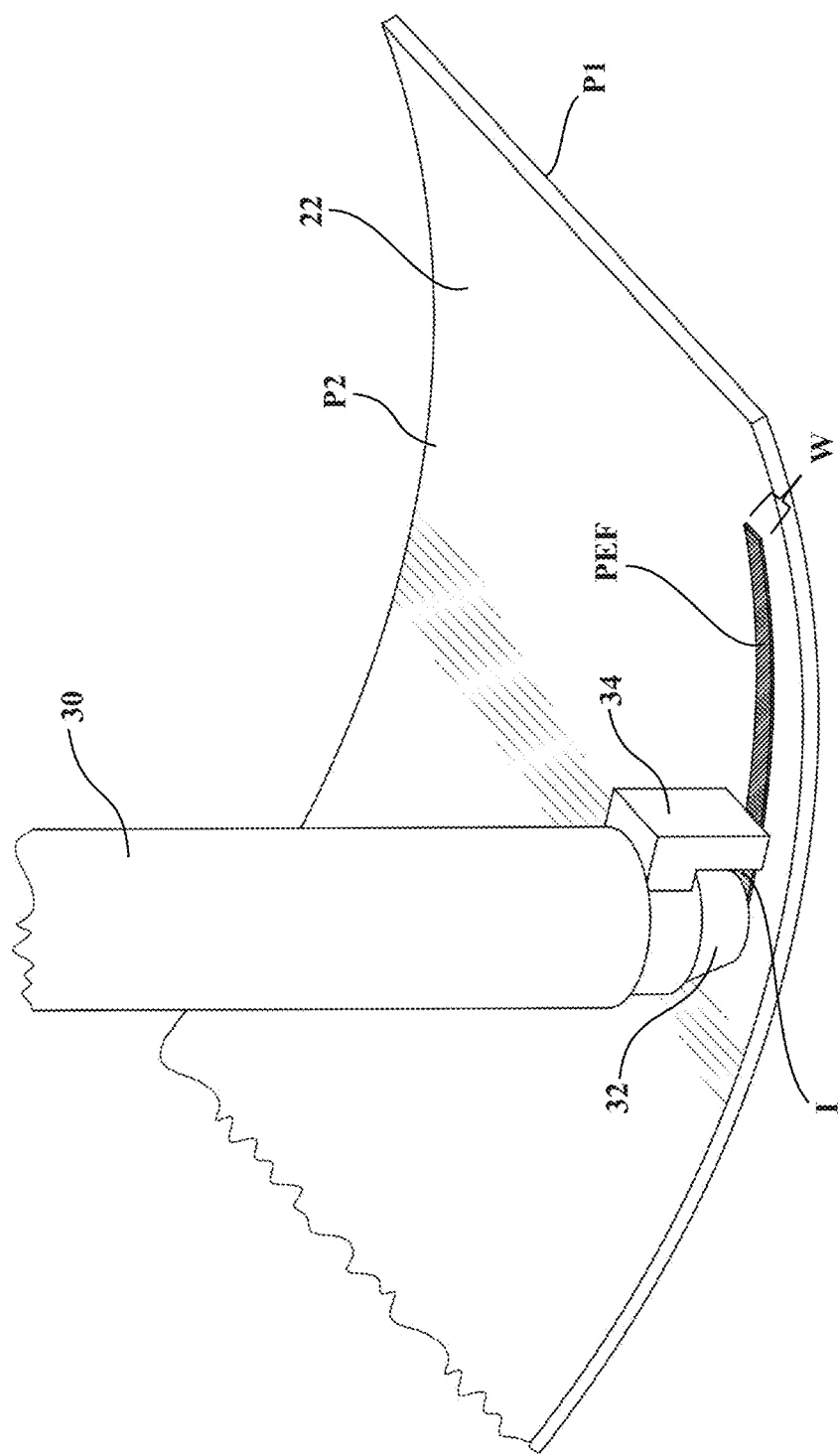
FIG. 3B is a top perspective view of FIG. 3A.

Step S2 of the method 100 includes digitally-applying an ink I without a mask onto a surface of the curved glass substrate 22. For example, FIGS. 3A-3B illustrate digitally-applying the ink I onto the P2 surface of the curved glass substrate 22. As described in further detail below, examples of the ink I include, but are not limited to, an organic ink OI, a conductive ink CI, and a functional ink FI. Notably, the ink I is typically a liquid when digitally applied in step S2. However, it should be appreciated that the ink I may also be applied in other forms including, but not limited to, a powder. Additionally, the ink I may be free of ceramic frit, and, thus, in some examples, the glass assembly 20 is free of ceramic frit. As described in further detail below, the method 100 includes step (S3) of curing the ink I to solidify the ink I to form the performance-enhancing feature PEF.

The term digitally-applying refers to any suitable application process where application of the ink I is digitally controlled to deposit the ink I on a substrate in accordance with a digital based image, as opposed to conventional analog printing processes. Example processes for digitally-applying the ink I include, but are not limited to, inkjet printing, electro-hydrodynamic printing, laser printing, and the like. Notably, due to the precise control afforded by digitally-applying the ink I according to step S2 of the method 100, the ink I may be deposited at a significantly higher resolution than conventional analog printing processes. For example, the ink I may be digitally applied onto a surface of the curved glass substrate 22 at a resolution of greater than 200 dots per inch, greater than 300 dots per inch, greater than 400 dots per inch, greater than 500 dots per inch, greater than 600 dots per inch, greater than 700 dots per inch, greater than 800 dots per inch, greater than 900 dots per inch, greater than 1000 dots per inch, greater than 1100 dots per inch, greater than 1200 dots per inch, greater than 1300 dots per inch, greater than 1400 dots per inch, greater than 1500 dots per inch, greater than 1600 dots per inch, greater than 1700 dots per inch, greater than 1800 dots per inch, greater than 1900 dots per inch, greater than 2000 dots per inch, greater than 2100 dots per inch, greater than 2200 dots per inch, greater than 2300 dots per inch, greater than 2400 dots per inch, greater than 2500 dots per inch, or greater than 2600 dots per inch.

Accordingly, the higher resolution and precise control of the digital application process of step S2 allows the ink I to be deposited to form significantly more detailed features and achieve significantly tighter tolerances than conventional analog printing processes. In other words, "more detailed" features may include forming components of the performance-enhancing feature PEF that have a smaller geometry than achievable with conventional analog printing processes. Additionally, using a conventional analog printing process, such as screen printing, the performance-enhancing feature PEF may only be able to be repeatably located within a +/−1.5 millimeter tolerance. By contrast, due to the precise control afforded by digitally-applying the ink I according to step S2 of the method 100, the performance-enhancing feature PEF may be more repeatably located in production than conventional analog screen printing processes. For example, using the digital application process of step S2 the performance-enhancing feature PEF may be repeatably located within a +/−0.1 millimeter tolerance.

Additionally, it is notable that a mask is not required when digitally-applying the ink I, as is typically required in conventional analog printing processes. For example, as shown in FIGS. 3A and 3B, when digitally-applying the ink I according to step S2 of the method 100, the ink I is deposited directly onto a surface of the curved glass substrate 22 in accordance with a digital based image, eliminating the need for a mask and using less ink than the excess ink required for conventional analog printing employing a mask. Further, due to increased control afforded by digitally-applying the ink I, it is possible to digitally apply the ink I as a much thinner layer than possible with conventional analog printing processes. As an example, the ink I may have a thickness of greater than 0.1 micrometers and less than 15 micrometers on the surface of the curved glass substrate 22. Additionally, it is contemplated that the ink I may be digitally applied at a variable thickness and cured to form a performance-enhancing feature PEF having a variable thickness.

Further, digitally-applying the ink I according to the method 100 is advantageous over conventional analog printing processes because the digital-based image used to control the digital-application process can be changed quickly and electronically, whereas changing the design for a conventional analog printing process requires producing new physical printing tooling (such as screens for screen printing). Accordingly, digitally-applying the ink I according to step S2 of the method 100 allows for rapid prototyping of many different arrangements of performance-enhancing features PEF by only changing the digital-based image, as opposed to producing new analog printing tooling.

In the context of laminated glass assemblies 20, step S2 of the method 100 may include digitally-applying the ink I on at least one of the P1 surface of the first curved glass substrate 22, the P2 surface of the first curved glass substrate 22, the P3 surface of the second curved glass substrate 24, and the P4 surface of the second curved glass substrate 24. It should be appreciated that the ink I may be digitally-applied to at least one of the P1 surface, the P2 surface, the P3 surface, and the P4 surface according to any of the digital application processes described above. It is contemplated that the ink I may be applied to any combination of the P1 surface, the P2 surface, the P3 surface, and the P4 surface.

Notably, because the ink I is solidified onto the substrate on which it is applied, as opposed to being fired, the ink I does not fuse to the substrate like a conventional substance such as ceramic frit. Advantageously, because the glass assembly 20 formed according to the method 100 is not fired to fuse the ink I to the first curved glass substrate 22 and/or the second curved glass substrate 24, the strength of the first curved glass substrate 22 and/or the second curved glass substrate 24 is not affected. However, because the ink I does not fuse to the first curved glass substrate 22 and/or the second curved glass substrate 24, the performance-enhancing feature PEF may be more fragile as compared to conventional performance-enhancing features formed using conventional substances such as ceramic frit. Accordingly, in some examples, it is advantageous to digitally apply the ink I on at least one of the P2 surface of the first curved glass substrate 22 and the P3 surface of the second curved glass substrate 24 such that, upon lamination of the glass assembly 20 (described below in the context of step S4), the performance-enhancing feature PEF is sandwiched within the glass assembly 20 such that the first curved glass substrate 22 and the second curved glass substrate 24 protect the performance-enhancing feature PEF from the surrounding environment.

In one example, step S2 of digitally-applying the ink I comprises inkjet-printing the ink I onto the surface of the curved glass substrate 22. Generally, the term "inkjet-printing" refers to a printing process where a digitally controlled printhead propels droplets of ink onto a substrate in accordance with a digital based image. Examples of inkjet printing processes include, but are not limited to, continuous inkjet printing, thermal inkjet printing, piezo inkjet printing, drop-on-demand inkjet printing, and the like. Inkjet-printing the ink I onto a surface of the first curved glass substrate 22 and/or the second curved glass substrate 24 may be carried out at a resolution of greater than 200 dots per inch, greater than 300 dots per inch, greater than 400 dots per inch, greater than 500 dots per inch, greater than 600 dots per inch, greater than 700 dots per inch, greater than 800 dots per inch, greater than 900 dots per inch, greater than 1000 dots per inch, greater than 1100 dots per inch, greater than 1200 dots per inch, greater than 1300 dots per inch, greater than 1400 dots per inch, greater than 1500 dots per inch, greater than 1600 dots per inch, greater than 1700 dots per inch, greater than 1800 dots per inch, greater than 1900 dots per inch, greater than 2000 dots per inch, greater than 2100 dots per inch, greater than 2200 dots per inch, greater than 2300 dots per inch, greater than 2400 dots per inch, greater than 2500 dots per inch, or greater than 2600 dots per inch.

In another example, step S2 of digitally-applying the ink I comprises electro-hydrodynamically printing the ink I onto the surface of the curved glass substrate 22. Generally, the term "electro-hydrodynamic printing" refers to a printing process where a digitally controlled and electrically charged printhead directs ink through a nozzle and onto a substrate in accordance with a digital based image. In the context of the present disclosure, the nozzle may be the same width as the line width W (described below) of the performance-enhancing feature PEF. In some examples, the width of the nozzle may be as low as 10 micrometers. Accordingly, in some examples, the line width W of the performance-enhancing feature PEF is likewise 10 micrometers. Of course, it should be appreciated that a width of the nozzle may be selected that is wider than 10 micrometers to form performance-enhancing features PEF having a wider line width W than 10 micrometers. Additionally, it is contemplated that electro-hydrodynamically printing the conductive ink CI onto a surface of the first curved glass substrate 22 and/or the second curved glass substrate 24 may be carried out at a resolution of greater than 200 dots per inch, greater than 300 dots per inch, greater than 400 dots per inch, greater than 500 dots per inch, greater than 600 dots per inch, greater than 700 dots per inch, greater than 800 dots per inch, greater than 900 dots per inch, greater than 1000 dots per inch, greater than 1100 dots per inch, greater than 1200 dots per inch, greater than 1300 dots per inch, greater than 1400 dots per inch, greater than 1500 dots per inch, greater than 1600 dots per inch, greater than 1700 dots per inch, greater than 1800 dots per inch, greater than 1900 dots per inch, greater than 2000 dots per inch, greater than 2100 dots per inch, greater than 2200 dots per inch, greater than 2300 dots per inch, greater than 2400 dots per inch, greater than 2500 dots per inch, or greater than 2600 dots per inch.

As noted above, there is a challenge with digitally-applying inks onto a curved substrate. Accordingly, in one example, step S2 of digitally-applying the ink I comprises providing a robotic applicator 30 including a printhead 32. In this example, step S2 of digitally-applying the ink I further comprises positioning the robotic applicator 30 adjacent to a surface of the first curved glass substrate 22 and/or the second curved glass substrate 24. Additionally, in this example, step S2 of digitally-applying the ink I comprises digitally-applying the ink I from the printhead 32 of the robotic applicator 30 without a mask on the surface of the first curved glass substrate 22 and/or the second curved glass substrate 24 as the robotic applicator 30 moves the printhead 32 along the surface of the first curved glass substrate 22 and/or the second curved glass substrate 24. For example, FIGS. 3A and 3B show a schematic representation of a robotic applicator 30 and printhead 32 positioned adjacent to the P2 surface of the first curved glass substrate 22. Accordingly, in the context of the present example, step S2 of digitally-applying the ink I comprises digitally-applying the ink I from the printhead 32 of the robotic applicator 30 without a mask on the P2 surface of the first curved glass substrate 22 as the robotic applicator 30 moves the printhead 32 along the P2 surface of the first curved glass substrate 22.

Any suitable robotic applicator 30 that is capable of moving the printhead 32 along the surface of the first curved glass substrate 22 and/or the second curved glass substrate 24 is contemplated. In other words, a robotic applicator 30 that is configured to follow a path that curves with the curvature of the first curved glass substrate 22 and/or the second curved glass substrate 24 as the robotic applicator 30 moves the printhead 32 along the surface of the first curved glass substrate 22 and/or the second curved glass substrate 24 is desired. More specifically, a robotic applicator 30 that is suitable for maintaining a certain distance between the printhead 32 the surface of the first curved glass substrate 22 and/or the second curved glass substrate 24 and maintaining the printhead 32 at an angle that is substantially perpendicular to the surface of the first curved glass substrate 22 and/or the second curved glass substrate 24 is desired. For example, the robotic applicator 30 may be a six-axis robot, a Cartesian robot, or the like that is configured to move the printhead 32 along the surface of the first curved glass substrate 22 and/or the second curved glass substrate 24.

It is contemplated that the ink I is applied at a width per each pass of the robot applicator 30. The maximum width per pass that the printhead 32 may apply the ink I is based on the design and settings of the printhead 32. Any suitable printhead 32 capable of digitally-applying the ink I without a mask is contemplated. In one example, the printhead 32 digitally applies the ink I at a maximum width of from 30 millimeters to 70 millimeters per pass of the robotic applicator 30. Other printheads 32 are contemplated. It is also contemplated that the robotic applicator 30 may include multiple printheads 32 arranged adjacent to each other to increase the width that the robotic applicator 30 may digitally apply the ink I per pass.

Step S3 of the method 100 includes curing the ink I to form the performance-enhancing feature PEF on the surface of the curved glass substrate 22. Notably, after digital application, the ink I may spread out or disperse on the surface of the curved glass substrate 22 before step S3 of curing the ink I. For example, the ink I may be digitally-applied at a resolution of 400 dots per inch in step S2; however, before the curing step S3, the ink I that was digitally-applied at 400 dots per inch may spread out on the surface of the curved glass substrate 22 such that, upon completion of the curing step S3, the performance-enhancing feature PEF has a lower resolution of, for example, 200 dots per inch, than the resolution upon the initial digital application. Additionally, the curing step S3 itself may affect the resolution of the performance-enhancing feature PEF. For example, the ink I may expand or contract during the curing step S3, affecting the resolution of the performance-enhancing feature PEF.

Accordingly, the resolution of the ink I when digitally applied in step S2 may differ from the resolution of the performance-enhancing feature PEF after completion of step S3 of curing the digitally applied ink I. Thus, upon completion of step S3 of curing the digitally applied ink I, the performance-enhancing feature PEF may have a resolution of greater than 200 dots per inch. Particularly, it is contemplated that the performance-enhancing feature PEF may have a resolution of greater than 200 dots per inch, greater than 300 dots per inch, greater than 400 dots per inch, greater than 500 dots per inch, greater than 600 dots per inch, greater than 700 dots per inch, greater than 800 dots per inch, greater than 900 dots per inch, greater than 1000 dots per inch, greater than 1100 dots per inch, greater than 1200 dots per inch, greater than 1300 dots per inch, greater than 1400 dots per inch, greater than 1500 dots per inch, greater than 1600 dots per inch, greater than 1700 dots per inch, greater than 1800 dots per inch, greater than 1900 dots per inch, greater than 2000 dots per inch, greater than 2100 dots per inch, greater than 2200 dots per inch, greater than 2300 dots per inch, greater than 2400 dots per inch, greater than 2500 dots per inch, or greater than 2600 dots per inch.

As mentioned above, it is advantageous to cure the ink I because the ink I is typically a liquid when digitally applied in step S2. Accordingly, step S3 of curing the ink I may be initiated shortly after step S2 of digitally-applying the ink I to prevent running or smudging of the ink I. For example, the curing step S3 may be initiated within a time period from zero seconds to 5 seconds after step S2 of digitally-applying the ink I on the surface of the curved glass substrate 22. More specifically, the curing step S3 may be initiated within less than 5 seconds after step S2, less than 4 seconds after step S2, less than 3 seconds after step S2, less than 2 seconds after step S2, or less than 1 second after step S2.

In one example, step S3 of the method 100 includes thermally-curing (sometime referred to as "sintering") the ink I to form the performance-enhancing feature PEF. Any suitable thermal curing device is contemplated to thermally cure the ink I including, but not limited to, an oven or a heat gun, or an IR heater. It should be appreciated that thermally-curing in the context of the present disclosure does not rise to the level of firing the glass assembly 20. As described above, typical firing processes include heating a glass substrate to temperatures in excess of 500 degrees Celsius to fuse the substance, such as ceramic frit, into the glass substrate and/or to bend the glass substrate into a desired shape. On the other hand, thermally-curing in the context of the present disclosure involves subjecting the first curved glass substrate 22 and/or the second curved glass substrate 24 to a temperature sufficient to cure the ink I (but below the firing temperature of 500 degrees Celsius) on the surface of the first curved glass substrate 22 and/or the second curved glass substrate 24.

In some examples, the curing temperature for curing the ink I is selected in view of a thermal degradation temperature of the ink I. More specifically, a curing temperature is selected that is below the thermal degradation temperature of the ink I to prevent the ink I from burning off of the curved glass substrate 22 and to minimize optical distortion of the glass assembly 20. For example, the ink I may comprise a thermally curable organic monomer and functional particles (e.g. silver nanoparticles, a pigment, or the like) dispersed in the organic monomer. It should be appreciated that in other examples, the organic monomer can instead be an oligomer or a combination of monomers and oligomers. In this example, the ink I may have a thermal degradation temperature of 210 degrees Celsius. Accordingly, a curing temperature may be selected that is below 210 degrees Celsius, such as 200 degrees Celsius. Notably, the curing temperature for curing the ink I is significantly lower than the temperatures required for firing conventional substances. Accordingly, the glass assembly 20 does not experiences a temperature sufficient to soften the glass assembly 20 such that the glass assembly 20 significantly deforms. Accordingly, step S3 of curing the ink I is unlikely to introduce significant optical distortion into the glass assembly 20.

In other examples, step S3 of the method 100 includes photo-curing the ink I with a UV curing device 34. In this example, the ink I is a photo-curable ink I. The photo-curable ink I may include a photoinitiator, an organic monomer, and functional particles (e.g. silver nanoparticles, a pigment, or the like) dispersed in the organic monomer. It should be appreciated that in other examples, the organic monomer can instead be an oligomer or a combination of monomers and oligomers. The photoinitiator may include any suitable compound that initiates polymerization of the organic monomer in response to exposure to UV light. For example, the photoinitiator may be a compound that creates a reactive species (e.g. free radicals, cations, or anions) when exposed to UV light that initiates polymerization of the organic monomer and/or oligomer. Accordingly, in the present example, step S3 of curing the ink I to form the performance-enhancing feature PEF includes exposing the ink I to the UV curing device 34 to activate the photoinitiator to initiate polymerization of the organic monomer to cure the ink I. In this example, step S3 of curing the ink I does not involve any outside application of heat, thus, this example of step S3 is less likely to introduce significant optical distortion into the glass assembly 20.

In one example, the UV curing device 34 is a UV light emitting diode that emits UV light. For example, the UV curing device 34 may emit UV light having a wavelength of 315 nanometers to 400 nanometers (generally known as the UV-A spectrum). The UV light emitting diode may emit UV light having a narrower spectrum, such as emitting UV light that substantially has a wavelength of 385 nanometers. Any wavelength within the UV spectrum is contemplated.

FIG. 3A shows one example of step S3. In the example of FIG. 3A, the robotic applicator 30 further includes the UV curing device 34. Although not required, the UV curing device 34 may be arranged adjacent to the printhead 32 such that the UV curing device 34 follows the same path as the printhead 32 as the robotic applicator 30 moves the printhead 32 along the surface of the curved glass substrate 22. Accordingly, in the present example, step S3 of curing the ink I to form the performance-enhancing feature PEF comprises activating the UV curing device 34 of the robotic applicator 30 to initiate photo-curing of the digitally applied ink I as the robotic applicator 30 moves along the surface of the curved glass substrate 22. In doing so, step S3 of curing the ink I occurs shortly after step S2 of digitally-applying the ink I to prevent running or smudging of the ink I.

In some examples, step S3 of the method 100 may further include subjecting the glass assembly 20 to elevated humidity and/or pressure during one of the curing processes contemplated above.

In the context of laminated glass assemblies 20, step S3 of the method 100 includes curing the ink I to form the performance-enhancing feature PEF on at least one of the P1 surface, the P2 surface, the P3 surface, and the P4 surface. It should be appreciated that curing the ink I to form the performance-enhancing feature PEF on at least one of the P1 surface, the P2 surface, the P3 surface, and the P4 surface may be carried out according to any of the curing processes described above.

Figure 4A:
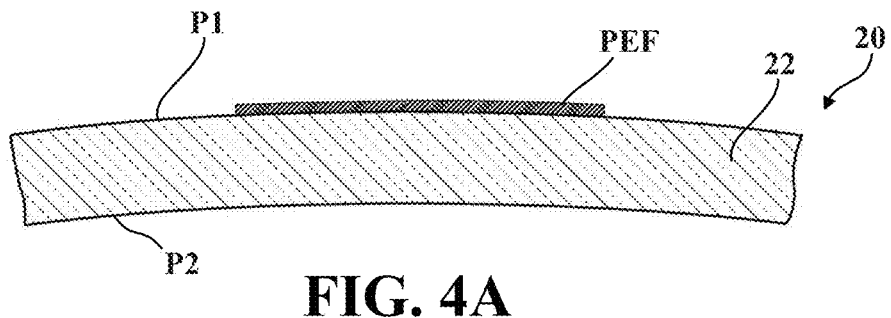
FIGS. 4A-4C are cross-sectional schematic representations of examples of a glass assembly including a performance-enhancing feature.
Figure 4B:
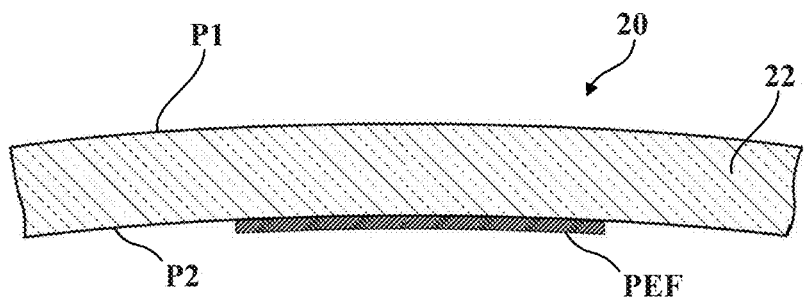
Figure 4C:
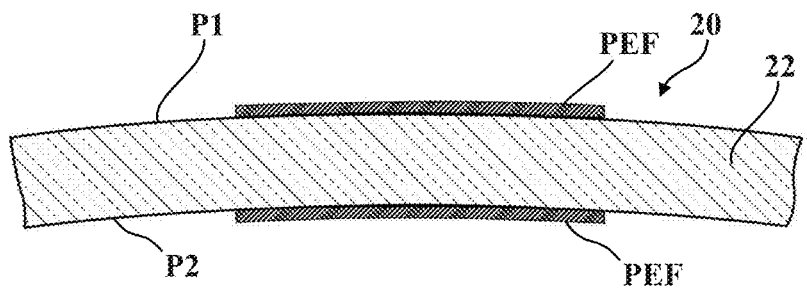

FIGS. 4A-4C show cross-sectional schematic representations of various examples of glass assemblies 20 formed according to the method 100. FIG. 4A shows one glass assembly 20 including the curved glass substrate 22 with the performance-enhancing feature PEF formed on the P1 surface of the curved glass substrate 22. FIG. 4B shows another glass assembly 20 including the curved glass substrate 22 with the performance-enhancing feature PEF formed on the P2 surface of the curved glass substrate 22. FIG. 4C shows yet another glass assembly 20 including the curved glass substrate 22 with one performance-enhancing feature PEF formed on the P1 surface of the curved glass substrate 22, and another performance-enhancing feature PEF formed on the P2 surface of the curved glass substrate 22.

Figure 5:
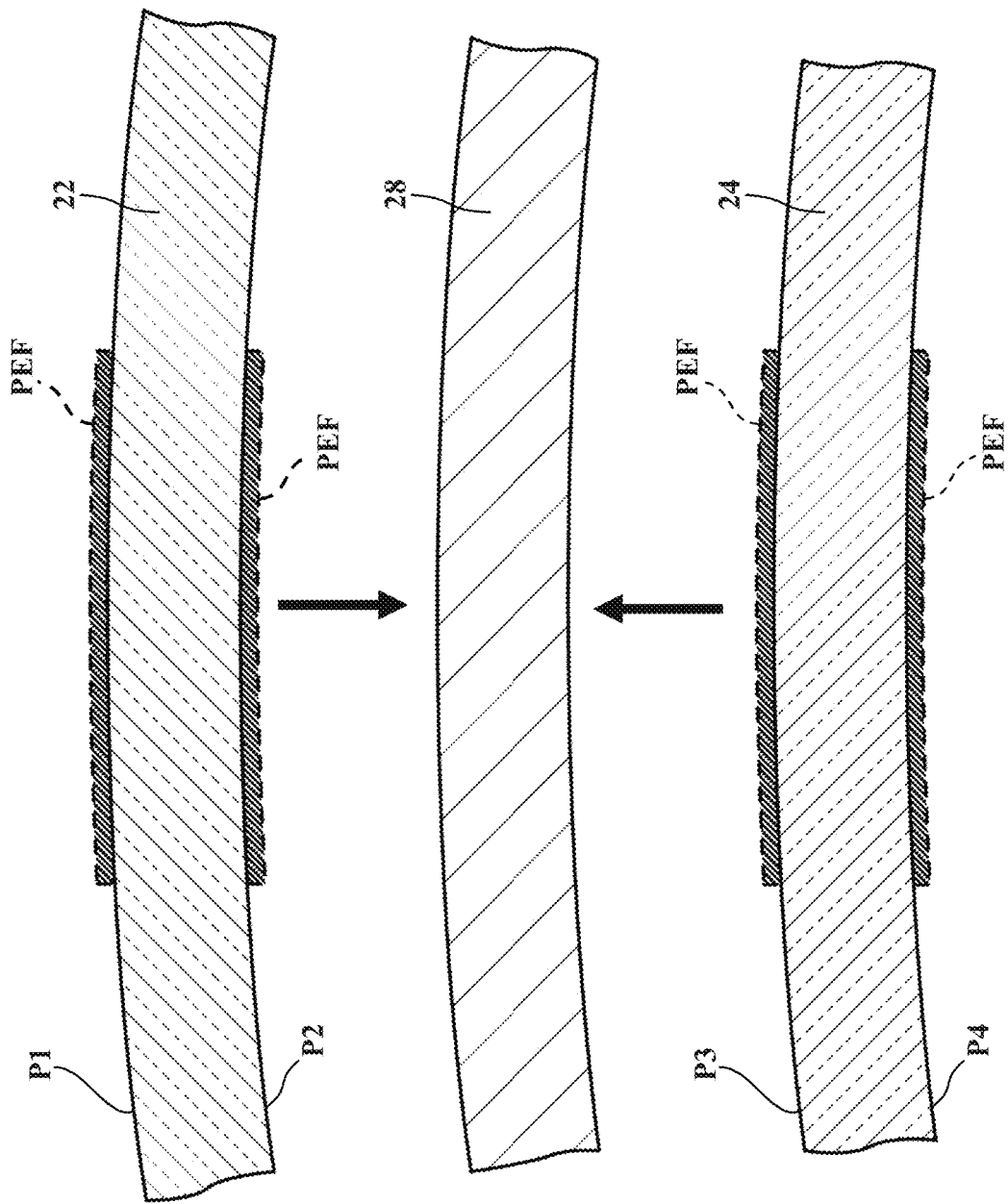
FIG. 5 is a cross-sectional schematic representation of a step of disposing a polymeric interlayer between a first curved glass substrate and a second curved glass substrate.

Referring to FIG. 5, where the glass assembly 20 is a laminated glass assembly 20, the method 100 further includes a step S4 of disposing a polymeric interlayer 28 between the P2 surface of the first curved glass substrate 22 and the P3 surface of the second curved glass substrate 24. The polymeric interlayer 28 bonds the first curved glass substrate 22 and the second curved glass substrate 24 such that the polymeric interlayer 28 retains the first curved glass substrate 22 and/or the second curved glass substrate 24 in the event of impact or breakage of the laminated glass assembly 20. The polymeric interlayer 28 includes a polymer or thermoplastic resin, such as polyvinyl butyral (PVB), ethylene-vinyl acetate (EVA), thermoplastic polyurethane (TPU), and the like. Other suitable materials for implementing the polymeric interlayer 28 may be utilized that provide the requisite performance characteristics regarding optical haze, adhesion to glass, and structural rigidity. Similar to the first curved glass substrate 22 and the second curved glass substrate 24, the polymeric interlayer 28 is also substantially transparent or otherwise transparent to light. Accordingly, the laminated glass assembly 20 that includes the polymeric interlayer 28 between the first curved glass substrate 22 and the second curved glass substrate 24 is also substantially transparent or otherwise transparent to light.

An example lamination process comprises the steps of stacking and aligning the first curved glass substrate 22, the second curved glass substrate 24, the polymeric interlayer 28, and any other interlayers that may be a part of the laminated glass assembly 20. After stacking and aligning these components, the glass assembly 20 may be subject to a de-airing process where the glass assembly 20 is subject to a vacuum to remove any air that may be trapped between the first curved glass substrate 22, the second curved glass substrate 24, the polymeric interlayer 28, and any other interlayers. After the de-airing process, the glass assembly 20 may be subject to an autoclave process where the glass assembly 20 is subject to an elevated temperature and/or an elevated pressure to bond the polymeric interlayer 28 to each of the layers adjacent to the polymeric interlayer 28 to form the laminated glass assembly 20. Notably, the temperature within the autoclave should be below the thermal degradation temperature of the ink I to prevent damage to the ink I.

Figure 6A:
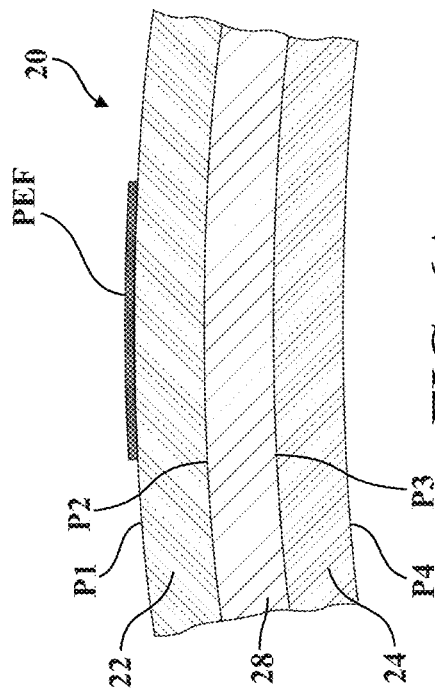
FIGS. 6A-6D are cross-sectional schematic representations of examples of a laminated glass assembly including a performance-enhancing feature.
Figure 6B:
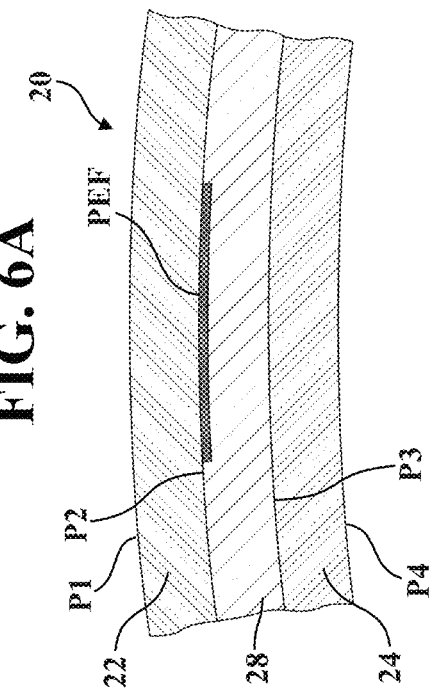
Figure 6C:
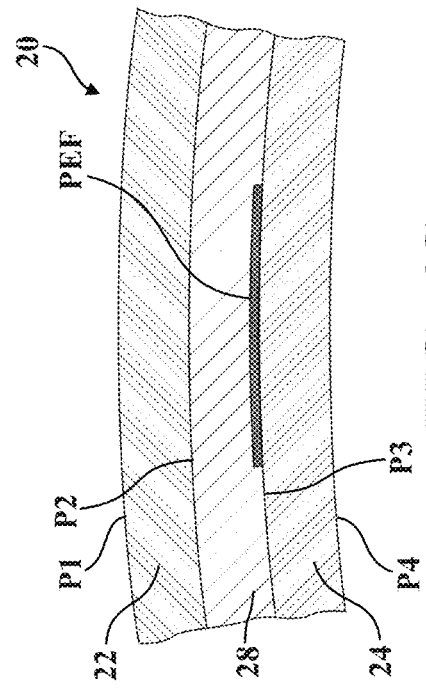
Figure 6D:
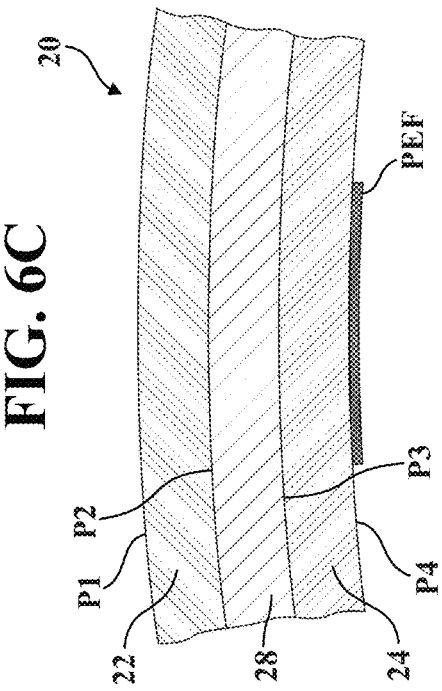

In the example shown in FIG. 6A, the laminated glass assembly 20 includes the first curved glass substrate 22, the performance-enhancing feature PEF formed on the P1 surface of the first curved glass substrate 22, the second curved glass substrate 24, and the polymeric interlayer 28 disposed between the P2 surface and the P3 surface. In the example shown in FIG. 6B, the laminated glass assembly 20 includes the first curved glass substrate 22, the performance-enhancing feature PEF formed on the P2 surface of the first curved glass substrate 22, the second curved glass substrate 24, and the polymeric interlayer 28 disposed between the P2 surface and the P3 surface. In the example shown in FIG. 6C, the laminated glass assembly 20 includes the first curved glass substrate 22, the second curved glass substrate 24, the performance-enhancing feature PEF formed on the P3 surface of the second curved glass substrate 24, and the polymeric interlayer 28 disposed between the P2 surface and the P3 surface. In the example shown in FIG. 6D, the laminated glass assembly 20 includes the first curved glass substrate 22, the second curved glass substrate 24, performance-enhancing feature PEF formed on the P4 surface of the second curved glass substrate 24, and the polymeric interlayer 28 disposed between the P2 surface and the P3 surface. Although FIGS. 6A-6D show the performance-enhancing feature PEF formed on the P1 surface, the P2 surface, the P3 surface, and the P4 surface individually, it is contemplated that a plurality of performance-enhancing features PEF may be formed on any combination of the P1 surface, the P2 surface, the P3 surface, and the P4 surface.

In some examples, the ink I may be an organic ink OI. In some examples, the organic ink OI is a photo-curable organic ink OI. Similar to the photo-curable ink I described above, the photo-curable organic ink OI may include a photoinitiator, an organic monomer, and a pigment. In another examples, the organic ink OI may comprise a thermally-curable organic monomer and a pigment. In these examples, step S2 of the method 100 comprises digitally-applying the organic ink OI without a mask onto a surface of at least one of the first curved glass substrate 22 and the second curved glass substrate 24. The organic ink OI may be digitally applied according to the digital application processes described above. Additionally, in these examples, step S3 of the method 100 includes curing the organic ink OI to form the performance-enhancing feature PEF on a surface of at least one of the first curved glass substrate 22 and the second curved glass substrate 24. The organic ink OI may be cured according to the curing processes described above.

Figure 7:
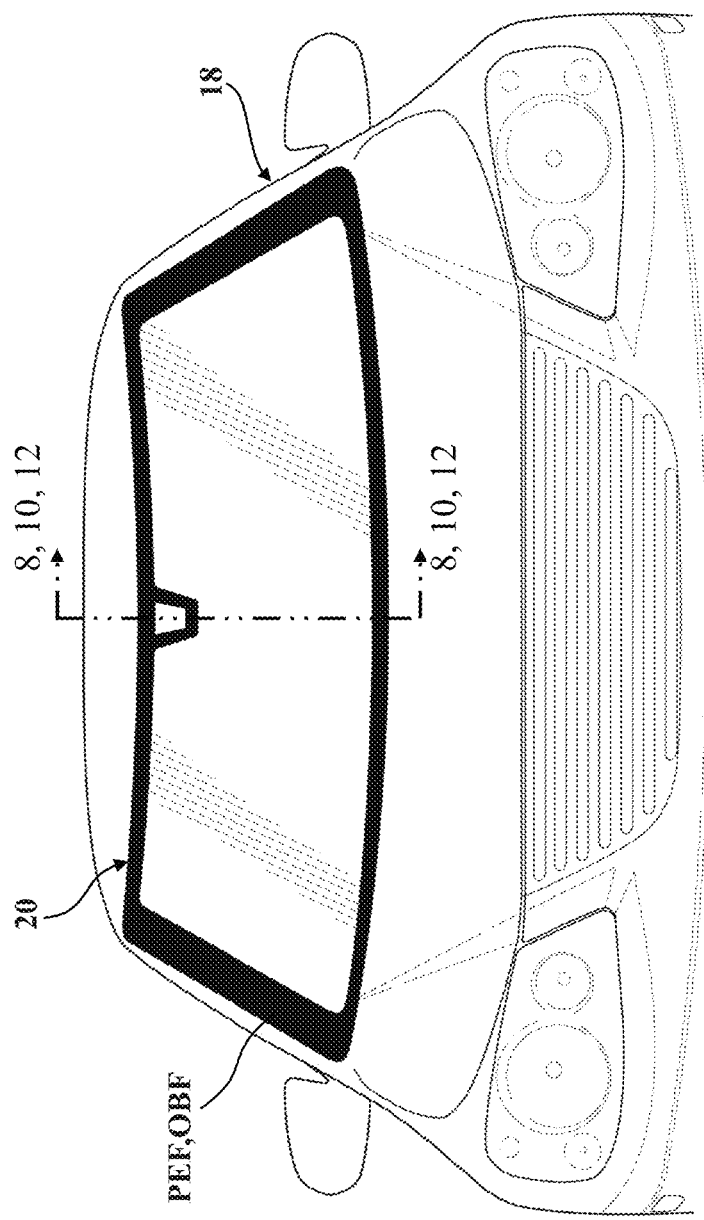
FIG. 7 is a partial front view of a vehicle including a front glass assembly including an opaque boundary feature.
Figure 8A:
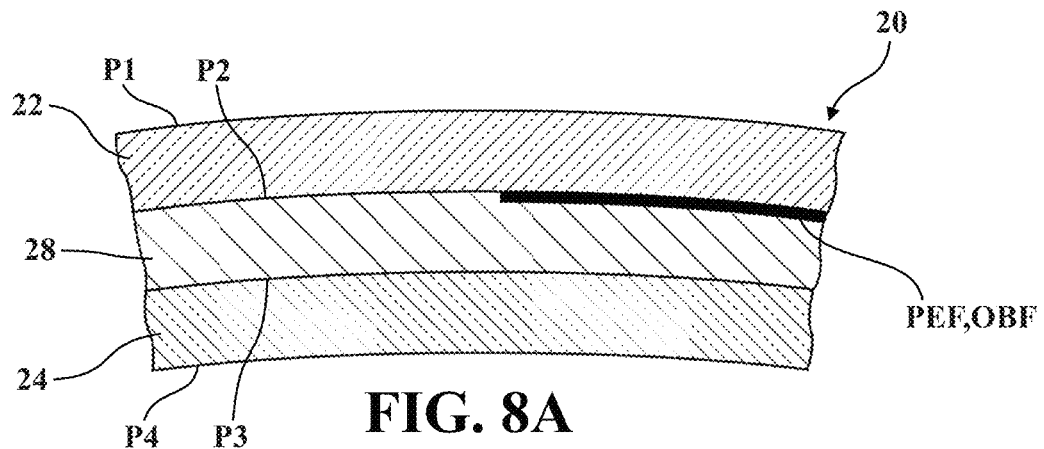
FIGS. 8A-8C are cross-sectional schematic representations of examples of the glass assembly of FIG. 7 taken along line 8-8 including an opaque boundary feature.
Figure 8B:
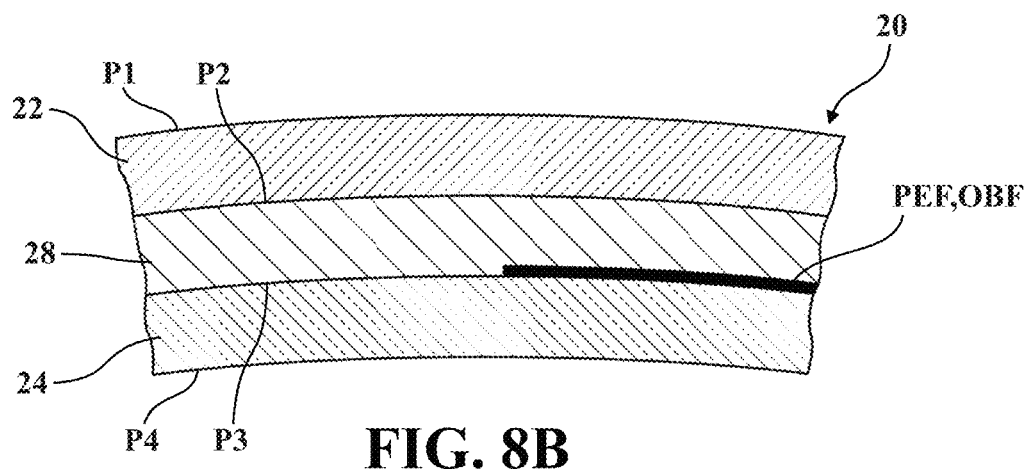
Figure 8C:
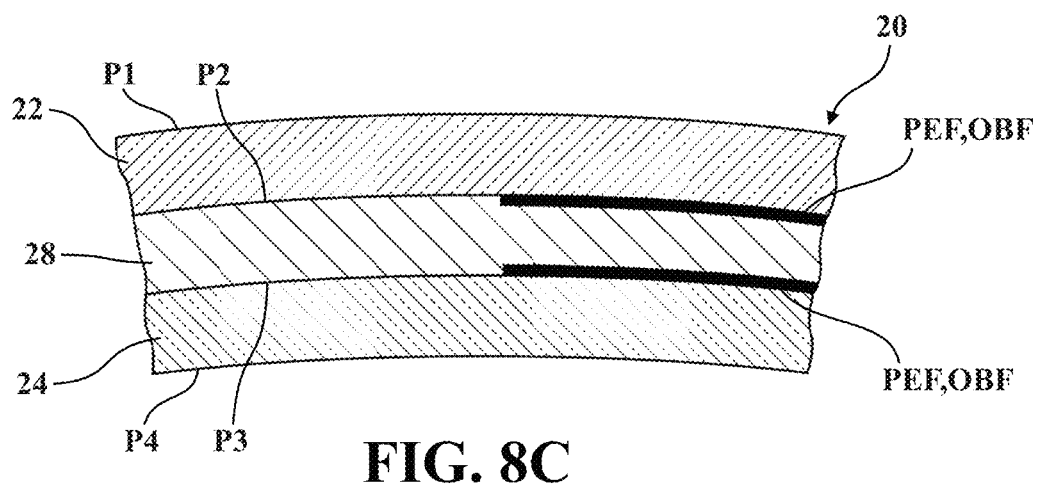

In examples where the ink I is an organic ink OI, the performance-enhancing feature PEF may be formed as an opaque boundary feature OBF. Referring now to FIGS. 7-11B, various examples of a laminated glass assembly 20 including the opaque boundary feature OBF are illustrated. For example, FIG. 7 shows a vehicle 18 including a front glass assembly 20 formed according to the method 100 to include an opaque boundary feature OBF. FIGS. 8A-8C show cross-sectional schematic representations of the laminated glass assembly 20 including the opaque boundary feature OBF. In the example shown in FIG. 8A, the glass assembly 20 includes the first curved glass substrate 22, the opaque boundary feature OBF formed on the P2 surface of the first curved glass substrate 22, the second curved glass substrate 24, and the polymeric interlayer 28 disposed between the P2 surface and the P3 surface. In the example shown in FIG. 8B, the glass assembly 20 includes the first curved glass substrate 22, the second curved glass substrate 24, the opaque boundary feature OBF formed on the P3 surface of the second curved glass substrate 24, and the polymeric interlayer 28 disposed between the P2 surface and the P3 surface. In the example shown in FIG. 8C, the glass assembly 20 includes the first curved glass substrate 22, one opaque boundary feature OBF formed on the P2 surface of the first curved glass substrate 22, the second curved glass substrate 24, another opaque boundary feature OBF formed on the P3 surface of the second curved glass substrate 24, and the polymeric interlayer 28 disposed between the P2 surface and the P3 surface. While FIGS. 8A-8C show the opaque boundary feature OBF formed on at least one of the P2 surface of the first curved glass substrate 22 and the P3 surface of the second curved glass substrate 24, it should be appreciated that the opaque boundary feature OBF may be formed on one or more of the P1 surface, P2 surface, P3 surface, or P4 surface of a laminated glass assembly 20, or on at least one of the P1 surface and P2 surface of a glass assembly 20 including only the first curved glass substrate 22.

Figure 9A:
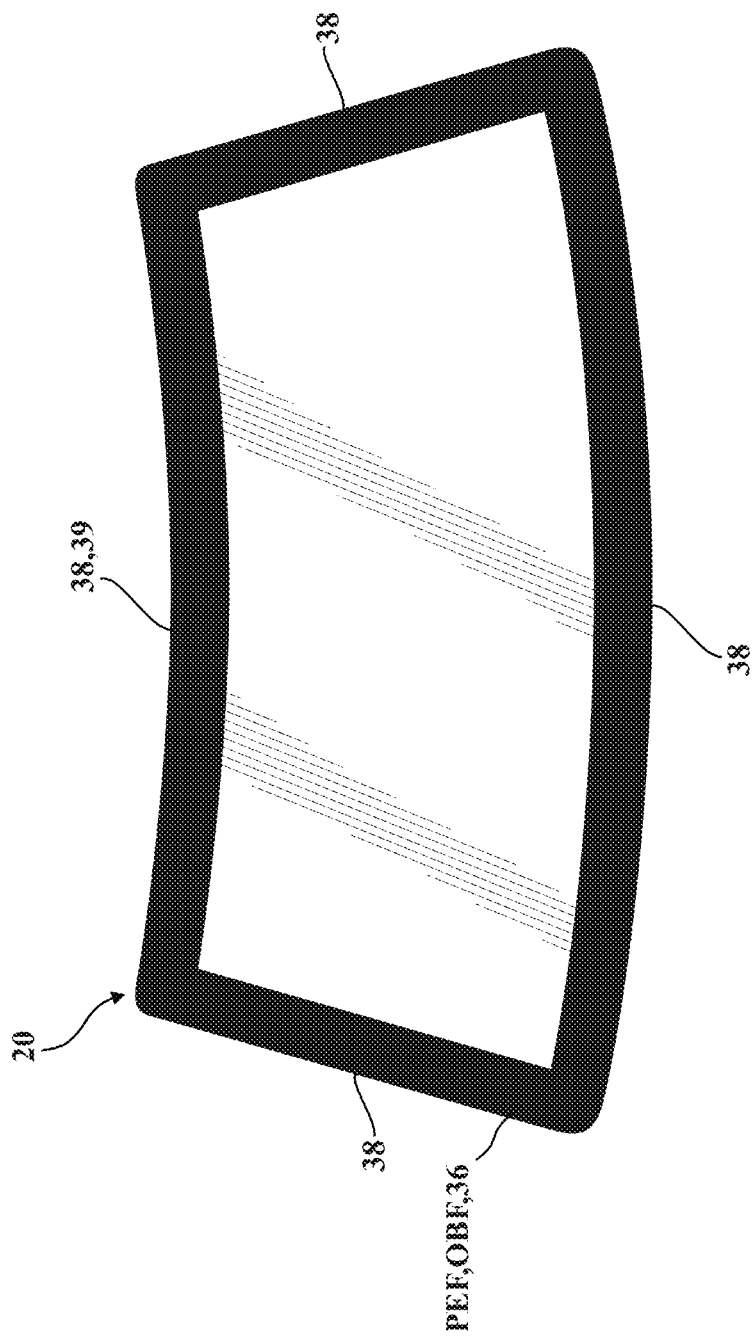
FIG. 9A is a front view of a glass assembly including an opaque boundary feature formed as a band.
Figure 9B:
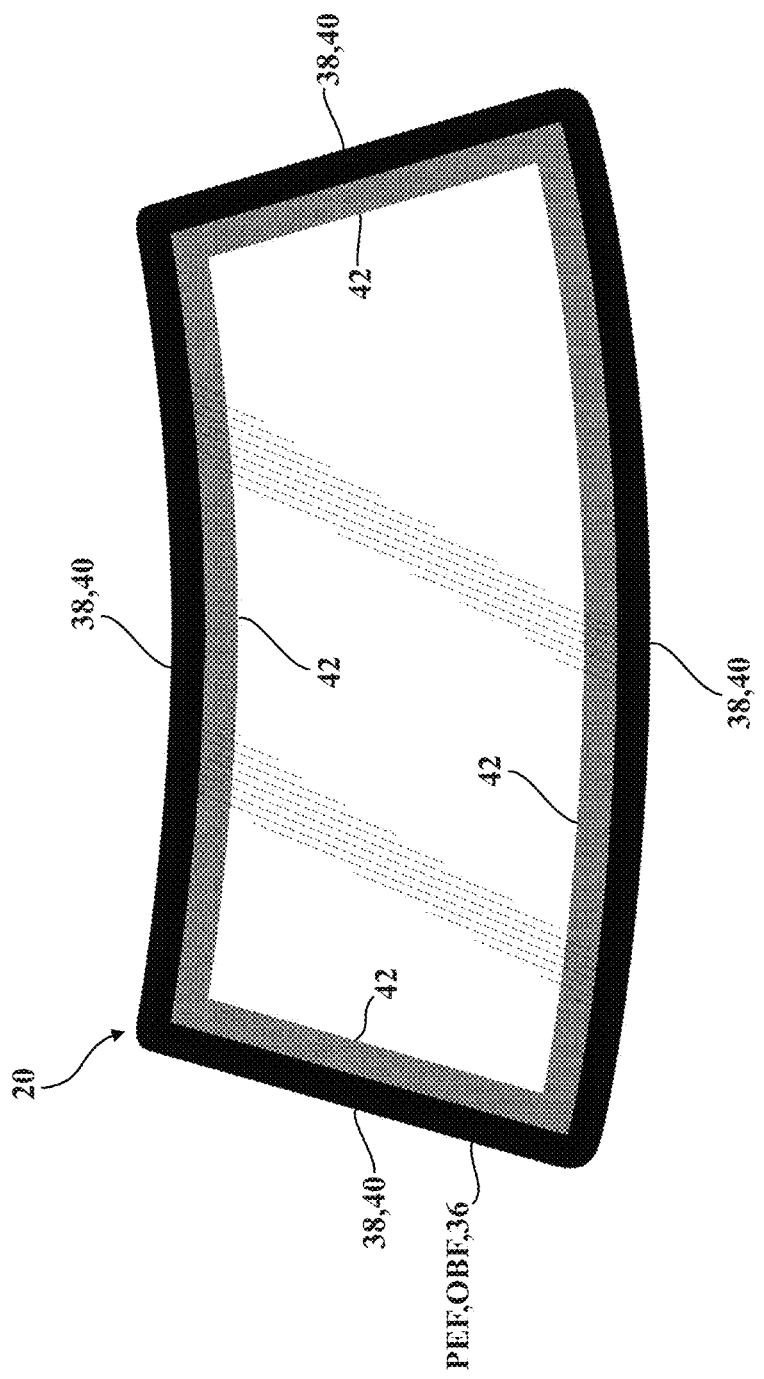
FIG. 9B is a front view of a glass assembly including an opaque boundary feature formed as a band, with the band having a first opacity at a first edge and a second opacity at a second edge.

FIGS. 9A and 9B each show a front view of a glass assembly 20 formed according to the method 100. In these examples, the opaque boundary feature OBF is formed as a band 36 extending around the entirety of a peripheral edge 38 of the glass assembly 20. In FIGS. 9A and 9B, the glass assembly 20 is a windshield. However, it is contemplated that the opaque boundary features OBF formed as a band 36 extending around the entirety of a peripheral edge 38 of the glass assembly 20 may be formed in other examples of the glass assembly 20 such as side windows, quarter windows, rear windows, and the like. The band 36 extending around the entirety of the peripheral edge 38 of the glass assembly 20 serves a number of functions. The band 36 blocks transmission of light through the region of the glass assembly 20 extending around the entirety of a peripheral edge 38. In doing so, the band 36 prevents UV light from deteriorating an underlying adhesive that may bond the glass assembly 20 to the vehicle. As another example, the band 36 may extend further down from the top 39 of the glass assembly 20 to function as a sunshade to shield a driver's eyes from sunlight. The band 36 may also block visibility of the underlying adhesive to an outside observer, providing an improved aesthetic exterior appearance. As another example, the band 36 may define a decorative pattern that is aesthetically pleasing, such as a dot pattern, a manufacturer logo, or governmentally required information (such as information required by FMVSS 205).

Referring to FIG. 9A, in one example, the opaque boundary feature OBF has an opacity that is uniform throughout the entire opaque boundary feature OBF. In this context, opacity refers to an average transmission of visible light through a sample area of the opaque boundary feature OBF. The opacity of the opaque boundary feature OBF may be measured using a light transmittance meter (for example, according to ISO 9050 and/or ISO 13837) to determine the amount of light that the opaque boundary feature OBF absorbs, scatters, or reflects. In one example, the opaque boundary feature OBF may have an opacity of less than 1% transmission of visible light, or even less than 0.1% transmission of visible light.

In other examples, referring to FIG. 9B, the opaque boundary feature OBF has a first edge 40 and a second edge 42 opposite the first edge 40. The first edge 40 may be the peripheral edge 38 of the glass assembly 20, and the opaque boundary feature OBF may terminate at the second edge 42 as the opaque boundary feature OBF extends inward from the first edge 40. In the example of FIG. 9B, the opaque boundary feature does not have an opacity that is uniform throughout the entire opaque boundary feature OBF. Rather, the opaque boundary feature OBF has a first opacity at the first edge 40, and a second opacity at the second edge 42. In the example of FIG. 9B, the second opacity is less than the first opacity.

Notably, since the organic ink OI is digitally applied, the organic ink OI may form significantly more detailed features than conventional analog printing to affect the opacity of the opaque boundary feature OBF. For example, the organic ink OI may be applied with nearly full coverage at the first edge 40 such that the first opacity of the opaque boundary feature OBF is less than 1% transmission of visible light, and the organic ink OI may be applied with less than full coverage at the second edge 42 such that the second opacity is greater than 1% transmission of visible light. Accordingly, in some configurations, the first opacity may be less than 1% transmission of visible light, or even less than 0.1% transmission of visible light, and the second of the opaque boundary feature OBF opacity may be greater than 99% transmission of visible light, or greater than 99.9% transmission of visible light. It is contemplated that the first opacity and the second opacity may be independently selected from any values between 0.1% transmission of visible light and 99.9% transmission of visible light. Additionally, any suitable transition between the first opacity and the second opacity is contemplated including, but not limited to, a smooth transition between the first opacity and the second opacity (e.g. to form a gradient pattern), or a stepwise transition between the first opacity and the second opacity.

As described above, bands formed around a peripheral edge of a glass assembly are conventionally black in color. However, in the present disclosure, it is contemplated that the pigment of the organic ink OI may be any color, enabling more freedom of design choice in designing the glass assembly 20 including the opaque boundary feature OBF. While the band 36 illustrated in FIGS. 9A-10C is black, it is contemplated that the opaque boundary feature OBF may be formed to have any color such as black, shades of grey, white, any primary color, or combinations thereof.

Referring now to FIGS. 9A-11B, in some examples, the opaque boundary feature OBF includes an optical sensor boundary 44 arranged adjacent to the peripheral edge 38 of the glass assembly 20. Particularly, the optical sensor boundary 44 may be arranged on or near the peripheral edge 38 of the glass assembly 20. Any suitable location of the optical sensor boundary 44 that does not obscure the vision of the driver of the vehicle 18 is contemplated. The optical sensor boundary 44 may define a sensing window 46 that is aligned with a field of view FOV of an optical sensor 48 that is mounted to the glass assembly 20. It should be appreciated that the optical sensor may be mounted to the glass assembly 20 in any suitable manner. For example, FIGS. 10A-10C show a cross-sectional schematic representation of examples of the optical sensor 48 mounted to the glass assembly 20 on the P4 surface. Referring to FIG. 10A, in some examples, the optical sensor boundary 44 may be formed on only the P2 surface of the glass assembly 20. Referring to FIG. 10B, in some examples, the optical sensor boundary 44 is formed on only the P3 surface of the glass assembly 20. Referring to FIG. 10C, in some examples, the optical sensor boundary 44 is formed on both the P2 surface and the P3 surface of the glass assembly 20. While FIGS. 10A-show the optical sensor boundary 44 formed on at least one of the P2 surface of the first curved glass substrate 22 and the P3 surface of the second curved glass substrate 24, it should be appreciated that the optical sensor boundary 44 may be formed on one or more of the P1 surface, P2 surface, P3 surface, or P4 surface of a laminated glass assembly 20, or on at least one of the P1 surface and P2 surface of a glass assembly 20 including only the first curved glass substrate 22.

As described above, opaque boundary features formed using conventional substances, such as ceramic frits, tend to exhibit significant optical distortion, which is particularly detrimental to the performance of optical sensors when the distortion is within the field of view of the optical sensor. In the context of the present disclosure, the glass assembly 20 including the opaque boundary feature OBF formed by the method 100 may be free of ceramic frit, and thus not subject to firing after printing, thereby substantially reducing the optical distortion of the glass assembly 20. Accordingly, the optical distortion of the glass assembly 20 is low enough to meet specifications required for optimal performance of optical sensors 48, such as a camera or a LIDAR sensor, as well as optical projecting devices, such as a heads-up-display. For example, a glass assembly 20 formed according to the method 100 may exhibit an optical distortion of less than 100 millidiopters within the sensing window 46.

However, in other examples, the opaque boundary feature OBF may be partially formed from enamel including ceramic frit that is subject to firing. Referring to FIG. 11C, the glass assembly 20 may include a first portion OBF' of the opaque boundary feature OBF that is formed by applying and subsequently firing an enamel including ceramic frit on a surface of at least one of the first curved glass substrate 22 and/or the second curved glass substrate 24. The glass assembly 20 may further include a second portion OBF" that is formed by digitally-applying and curing the organic ink OI. In the illustrated example, the first portion OBF' defines the band 36 extending around the entirety of a peripheral edge 38 of the glass assembly 20, and the second portion OBF" defines the optical sensor boundary 44 arranged adjacent to the peripheral edge 38 of the glass assembly 20 and defining the sensing window 46. Advantageously, because the optical sensor boundary 44 is formed according to the method 100, the optical distortion of the glass assembly 20 within the sensing window 46 is low enough to meet specifications required for optimal performance of optical sensors 48. More specifically, since the sensing window 46 is spaced from the first portion OBF' in this example, the optical distortion caused by firing the glass assembly 20 to form the first portion OBF' will not affect the portion of the glass assembly 20 that is aligned with the sensing window 46. Accordingly, the glass assembly 20 of the present example may exhibit an optical distortion of less than 100 millidiopters within the sensing window 46. Forming the first portion OBF' from enamel including ceramic frit in portions of the glass assembly 20 where optical distortion is not critical and forming the second portion OBF" from the organic ink OI in portions of the glass assembly 20 where optical distortion is critical may reduce the process time of forming the glass assembly 20 as compared to forming the entire opaque boundary feature OBF according to the method 100. It is contemplated that the first portion OBF' and the second portion OBF" may be any individual portions of the opaque boundary feature OBF.

Figure 11A:
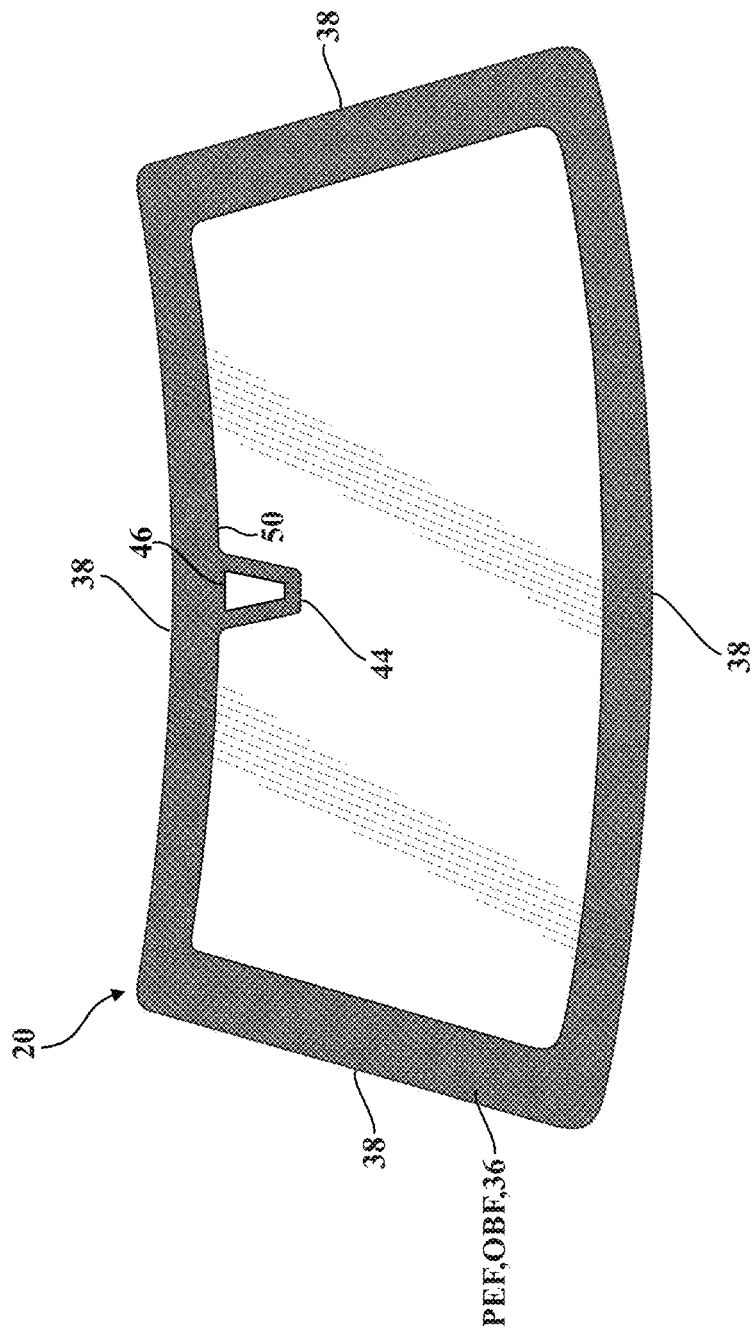
FIG. 11A is a front view of a glass assembly including an opaque boundary feature formed as a band and an optical sensor boundary defining a sensing window, where the sensing window is transparent to visible light.
Figure 11B:
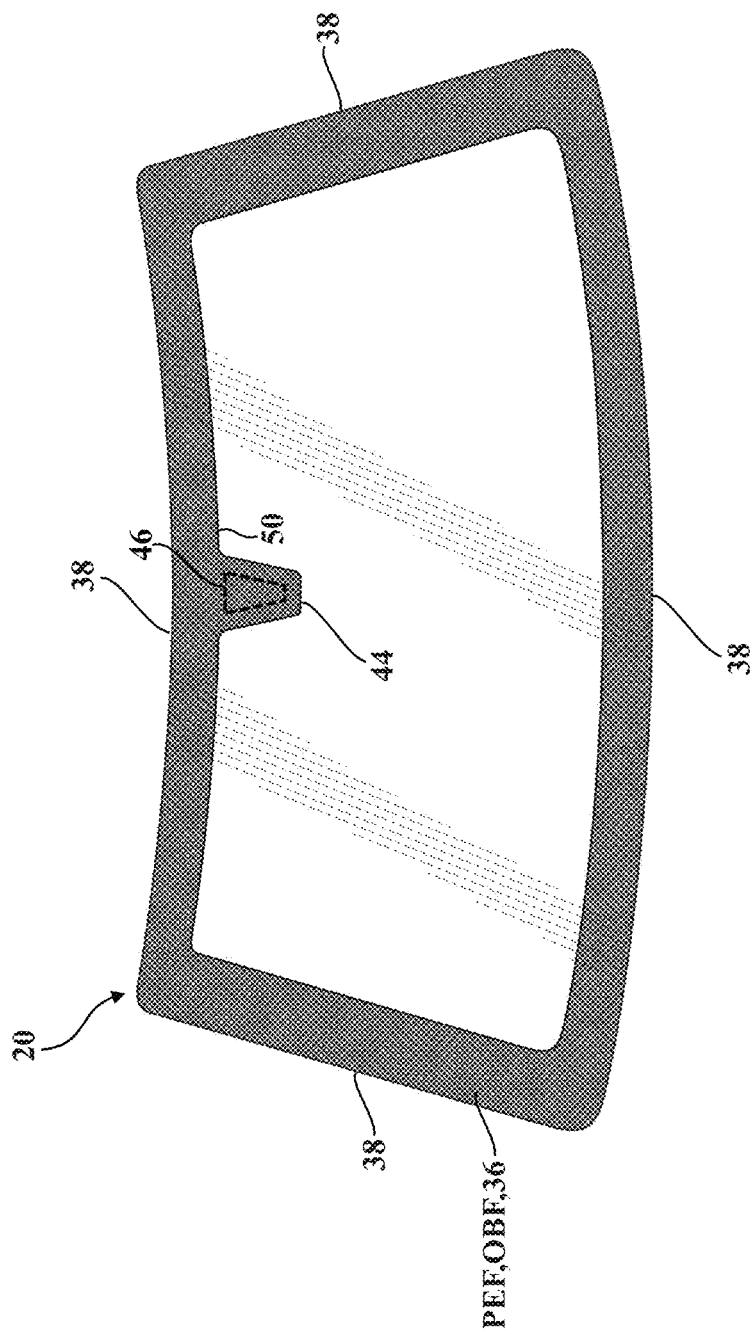
FIG. 11B is a front view of a glass assembly including an opaque boundary feature formed as a band and an optical sensor boundary defining a sensing window, where the sensing window is opaque to visible light and transparent to infrared light.
Figure 11C:
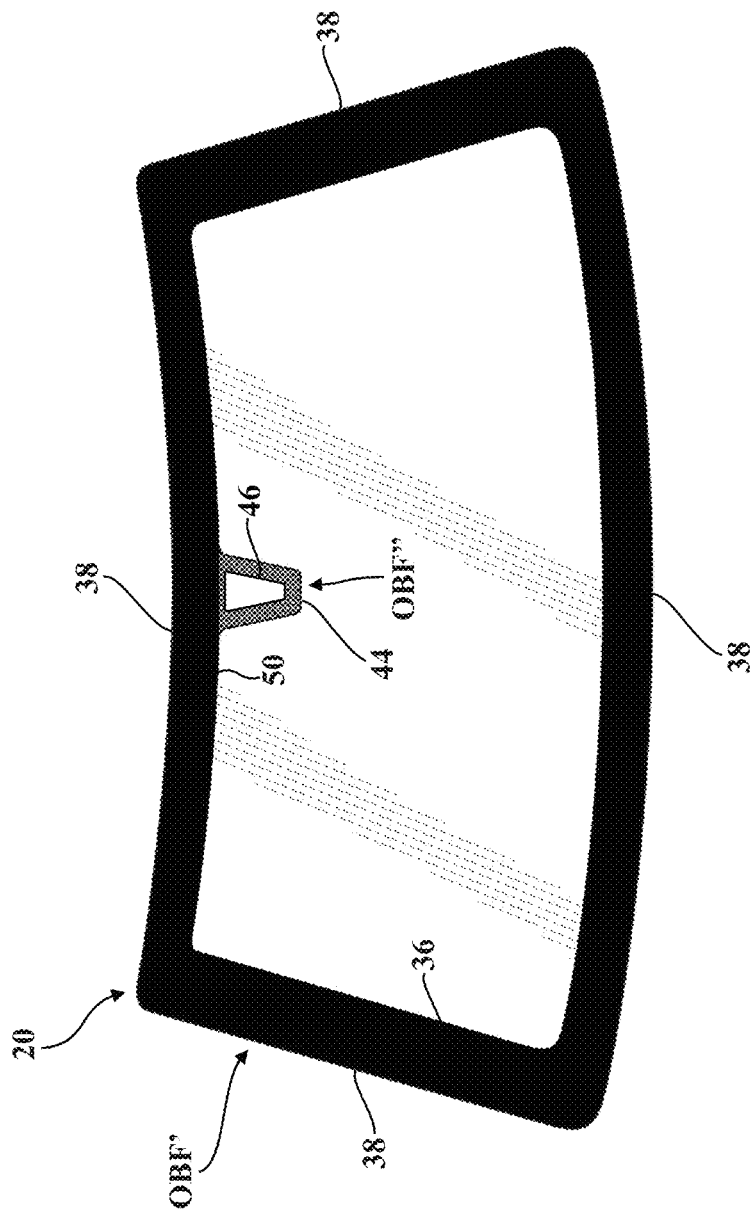
FIG. 11C is a front view of a glass assembly including an opaque boundary feature including a first portion formed from an enamel including ceramic frit and a second portion formed from organic ink.

FIGS. 11A and 11B each show a front view of one example of a glass assembly 20 formed according to the method 100. In these examples, the opaque boundary feature OBF of the glass assembly 20 includes the band 36 extending around the entirety of a peripheral edge 38 of the glass assembly 20, as well as an optical sensor boundary 44 extending downward from a top inner edge 50 of the band 36 to surround the field of view FOV of the optical sensor 48 to define the sensing window 46. However, it is contemplated that the band 36 and the optical sensor boundary 44 may not abut each other in all configurations. For example, the optical sensor boundary 44 may be spaced from the band 36. Additionally, in other configurations, the glass assembly 20 may only include an opaque boundary feature OBF defining the band 36. In further configurations, the glass assembly 20 may only include an opaque boundary feature OBF defining the optical sensor boundary 44.

Referring to the examples illustrated in FIGS. 10A-10C and 11A, the optical sensor boundary 44 defines a sensing window 46 that is free of the organic ink OI and therefore transparent to visible light. Notably, it is important that the sensing window 46 be transparent to visible light where the optical sensor 48 is a camera so that the camera can "see" through the sensing window 46. However, when the optical sensor 48 is a LIDAR sensor, the sensing window 46 is transparent to infrared light. Accordingly, in some configurations, an organic ink OI may be selected that is transparent to infrared light but opaque to visible light. Thus, referring to FIG. 11B, in some configurations, the optical sensor boundary 44 may include a sensing window 46 where organic ink OI is deposited such that the sensing window 46 is opaque to visible light. However, in this example, since the organic ink OI is transparent to infrared light, the LIDAR sensor will still "see" through the sensing window 46.

Figure 12A:
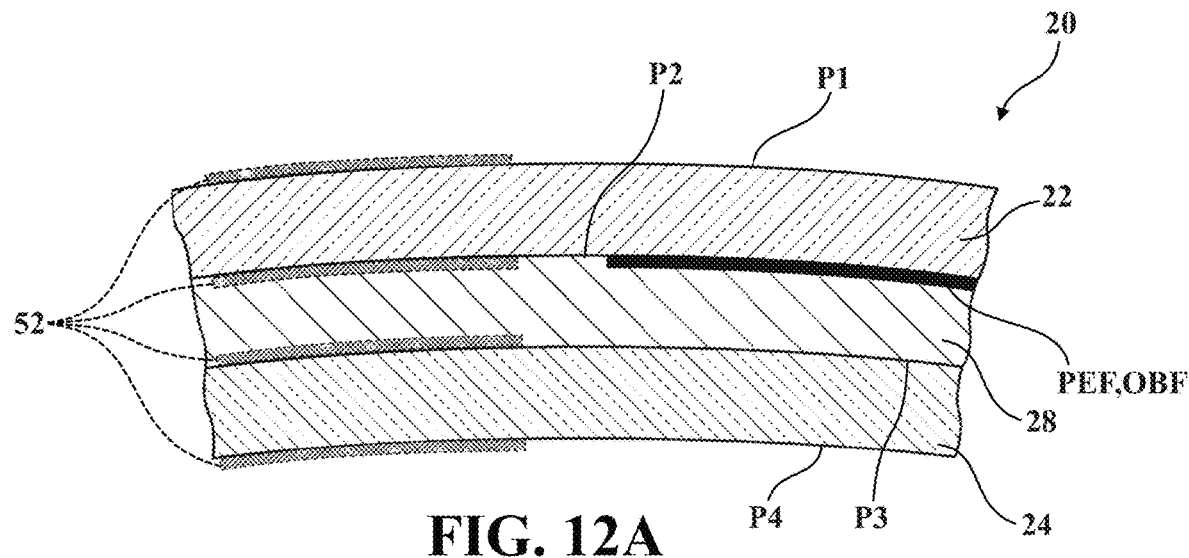
FIGS. 12A-12B are cross-sectional schematic representations of examples of the glass assembly of FIG. 7 taken along line 12-12 including an opaque boundary feature and an information containing graphic.
Figure 12B:
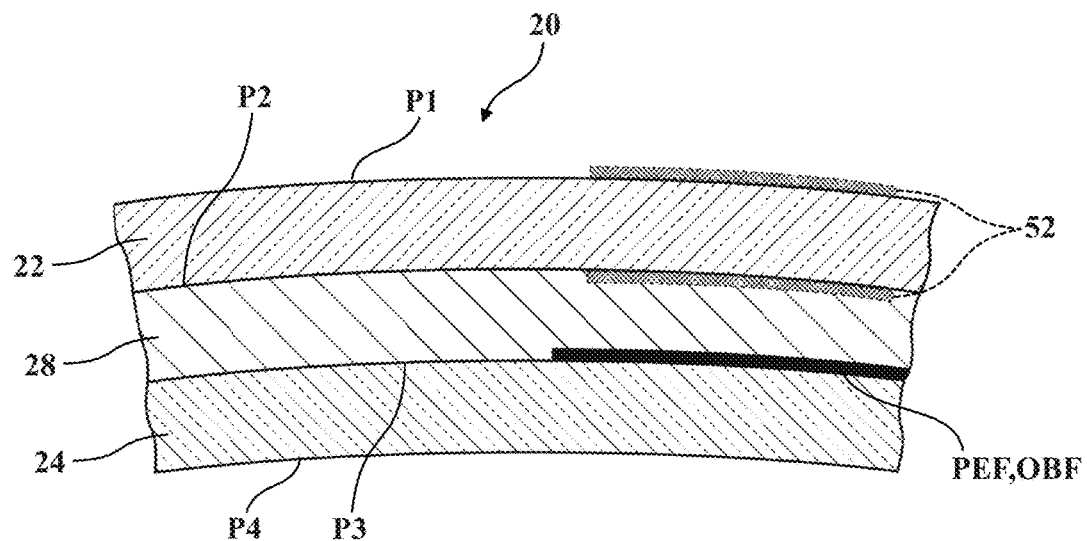

Additionally, in some configurations, the method 100 further comprises digitally-applying an ink I to form an information-containing graphic 52 on at least one of the P1 surface, the P2 surface, the P3 surface, and the P4 surface of the glass assembly 20. FIGS. 12A and 12B show schematic representations of some examples of arrangements of the information-containing graphic 52. For example, FIG. 12A illustrates potential arrangements of the information-containing graphic 52 on the glass assembly 20 where the information-containing graphic 52 is spaced from the opaque boundary feature OBF, with each of the potential arrangements of the information-containing graphic 52 defined by phantom lines. On the other hand, FIG. 12B illustrates potential arrangements of the information-containing graphic 52 where the information-containing graphic 52 is aligned with the opaque boundary feature OBF, with each of the potential arrangements of the information-containing graphic 52 defined by phantom lines. It is contemplated that the information-containing graphic 52 may be arranged on any suitable location or surface of the glass assembly 20 to convey the desired information. Additionally, it is contemplated that the ink I for the information-containing graphic 52 can be the same as or different from the organic ink OI.

Figure 13A:
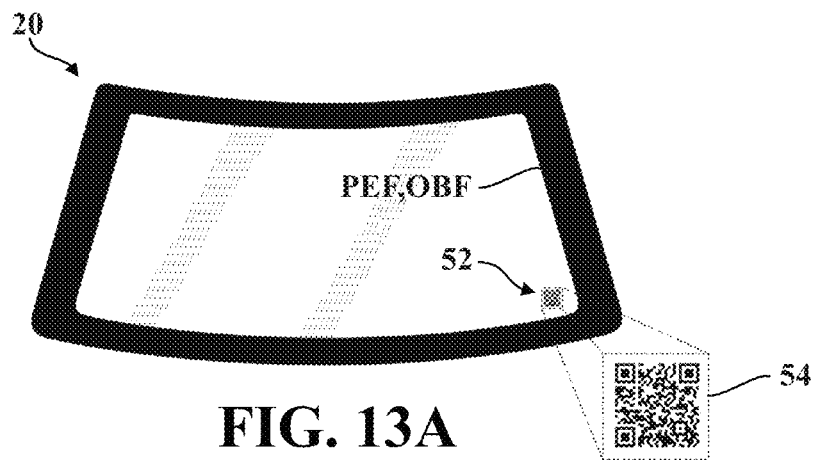
FIGS. 13A-13C are front views of examples of a glass assembly including an opaque boundary feature and an information containing graphic.
Figure 13B:
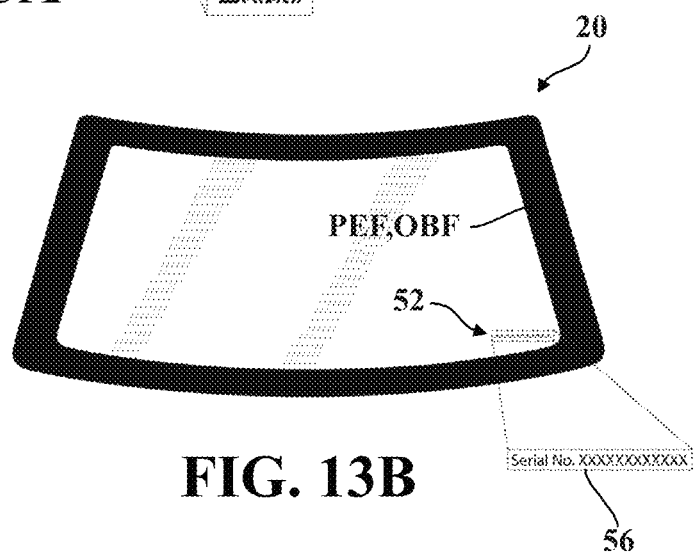
Figure 13C:
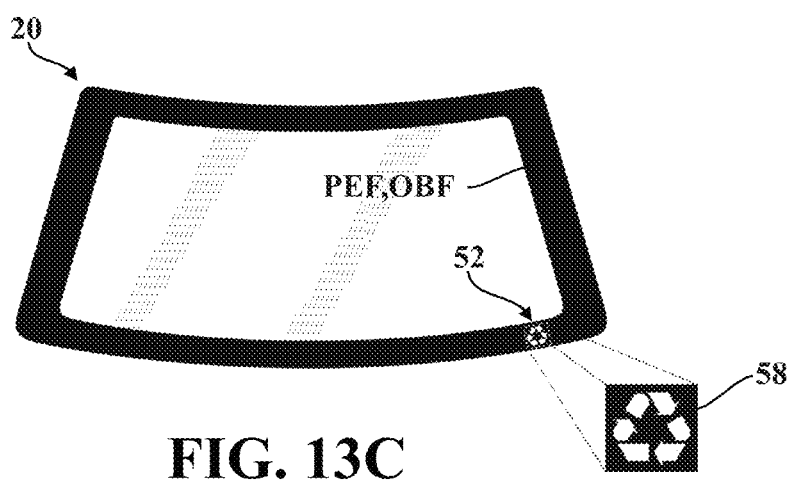

FIGS. 13A-13C show non-limiting examples of the information-containing graphic 52.

For example, FIG. 13A shows the information-containing graphic 52 as a barcode 54. It is contemplated that the barcode 54 may be a conventional barcode or a QR code. In another example, FIG. 13B shows the information-containing graphic 52 as a serial number 56. It is contemplated that the serial number 56 may be a serial number relating to the batch or individual serial number of the glass assembly, or the VIN number of a vehicle. FIG. 13C shows the information-containing graphic 52 as a graphic 58. It is contemplated that the graphic 58 may be formed as any desired design for decorative or informational purposes. Notably, FIGS. 13A and 13B illustrate examples of the information-containing graphic 52 spaced from the opaque boundary feature, while FIG. 13C illustrates an example of the information-containing graphic 52 aligned with the opaque boundary feature OBF.

In other examples, the ink I may be a conductive ink CI. In one example, the conductive ink CI is a photo-curable conductive ink CI. Similar to the photo-curable ink I described above, the photo-curable conductive ink CI may include a photoinitiator, an organic monomer, and conductive particles (e.g. silver nanoparticles or the like) dispersed in the organic monomer. In another example, the conductive ink CI may comprise a thermally-curable organic monomer and conductive particles (e.g. silver nanoparticles or the like) dispersed in the organic monomer. In yet another example, the conductive ink CI includes a metal-organic complex that is thermally cured to form the conductive feature CF. The metal-organic complex may comprise a silver-organic compound or any other suitable metal-organic complex that includes an organic component and a conductive metal component, such as a copper-organic compound, or the like. In this example, after the conductive ink CI including the metal-organic complex is digitally applied to the surface of the curved glass substrate 22 in step S2, step S3 comprises exposing the conductive ink CI to a temperature sufficient to volatize the organic component of the metal-organic complex such that only the metal particles (e.g. the silver particles) remain on the surface of the curved glass substrate 22 to form the conductive feature CF. Notably, the temperature sufficient to volatize the organic component of the metal-organic complex may be significantly lower than conventional substances used to form performance-enhancing features.

In these examples, step S2 of the method 100 comprises digitally-applying the conductive ink CI without a mask onto a surface of at least one of the first curved glass substrate 22 and the second curved glass substrate 24. The conductive ink CI may be digitally applied according to the digital application processes described above. Additionally, in these examples, step S3 of the method 100 includes curing the conductive ink CI to form the performance-enhancing feature PEF on the surface of at least one of the first curved glass substrate 22 and the second curved glass substrate 24. The conductive ink CI may be cured according to the curing processes described above.

In examples where the ink I is a conductive ink CI, the performance-enhancing feature PEF may be formed as a conductive feature CF including at least one conductive line 27. Advantageously, digitally-applying the conductive ink CI allows the at least one line 27 of the conductive feature CF to have a significantly lower width W than possible with conventional analog printing processes. For example, based on a conventional screen printing process at 100 dots per inch, the lowest width that an analog printing process can theoretically print a line is about 254 micrometers. Meanwhile, for example, digitally-applying the conductive ink CI at a resolution of 400 dots per inch may print the at least one line 27 of the conductive feature CF at a width W as low as 64 micrometers. As another example, digitally-applying the conductive ink CI at a resolution of 2500 dots per inch can print the at least one line 27 at a width W as low as 10 micrometers.

Figure 14:
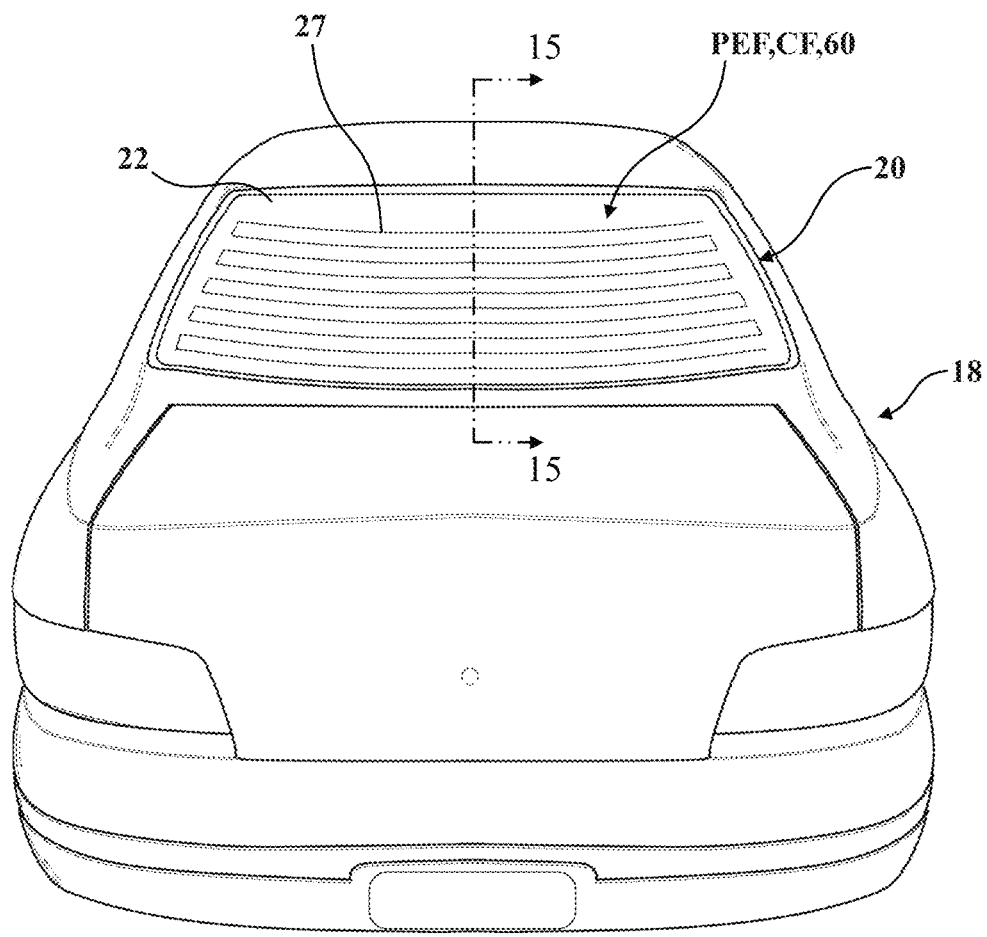
FIG. 14 is a rear perspective view of a vehicle including a rear glass assembly including a conductive feature defining a heating element.
Figures 15A, 15B:
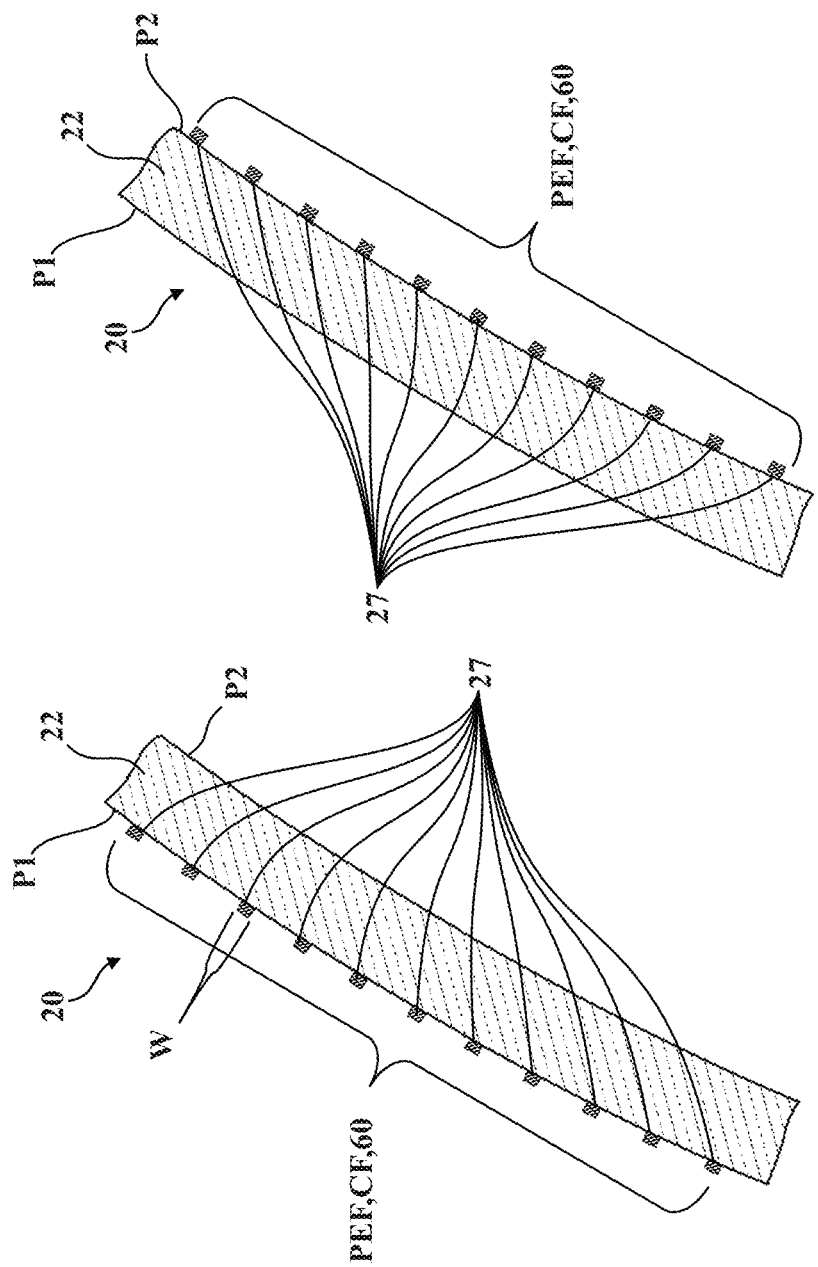
FIGS. 15A-15B are cross-sectional schematic representations of examples of the glass assembly of FIG. 14 taken along line 15-15.
Figure 16:
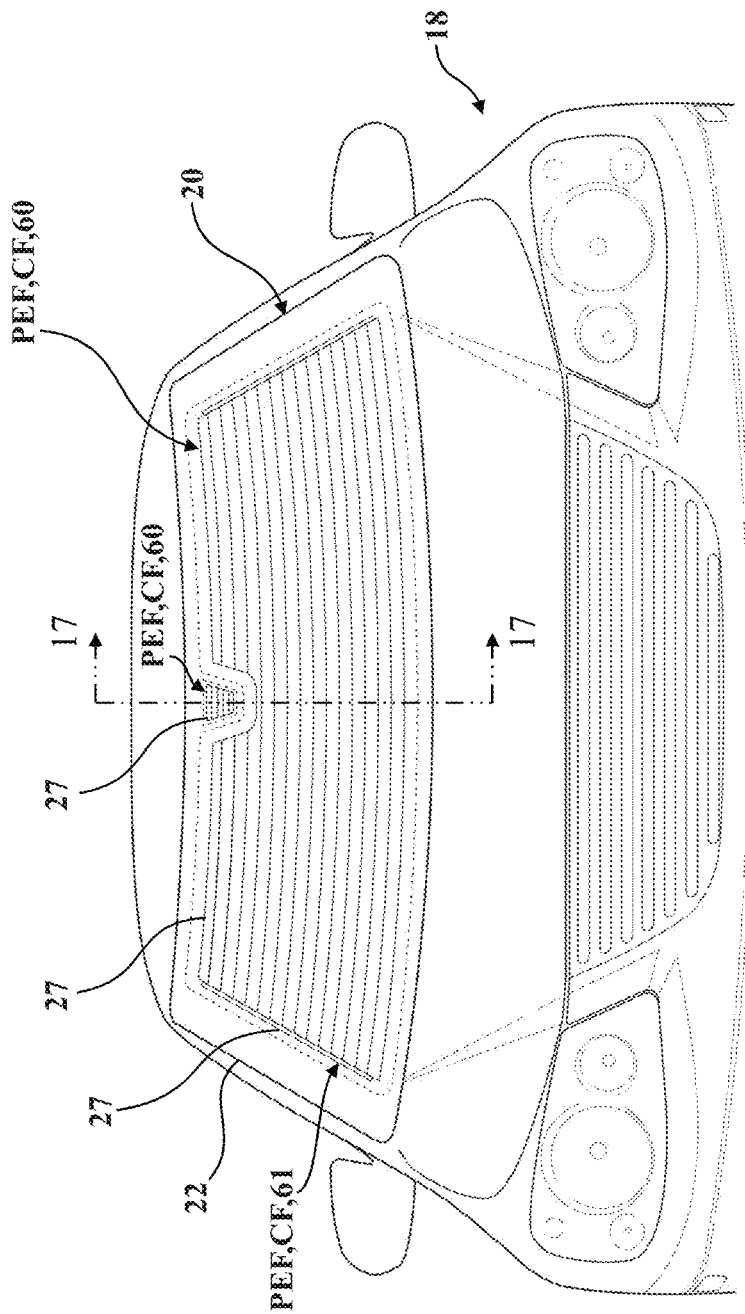
FIG. 16 is a front view of a vehicle including a front glass assembly including a conductive feature defining a heating element.
Figures 17A, 17B:
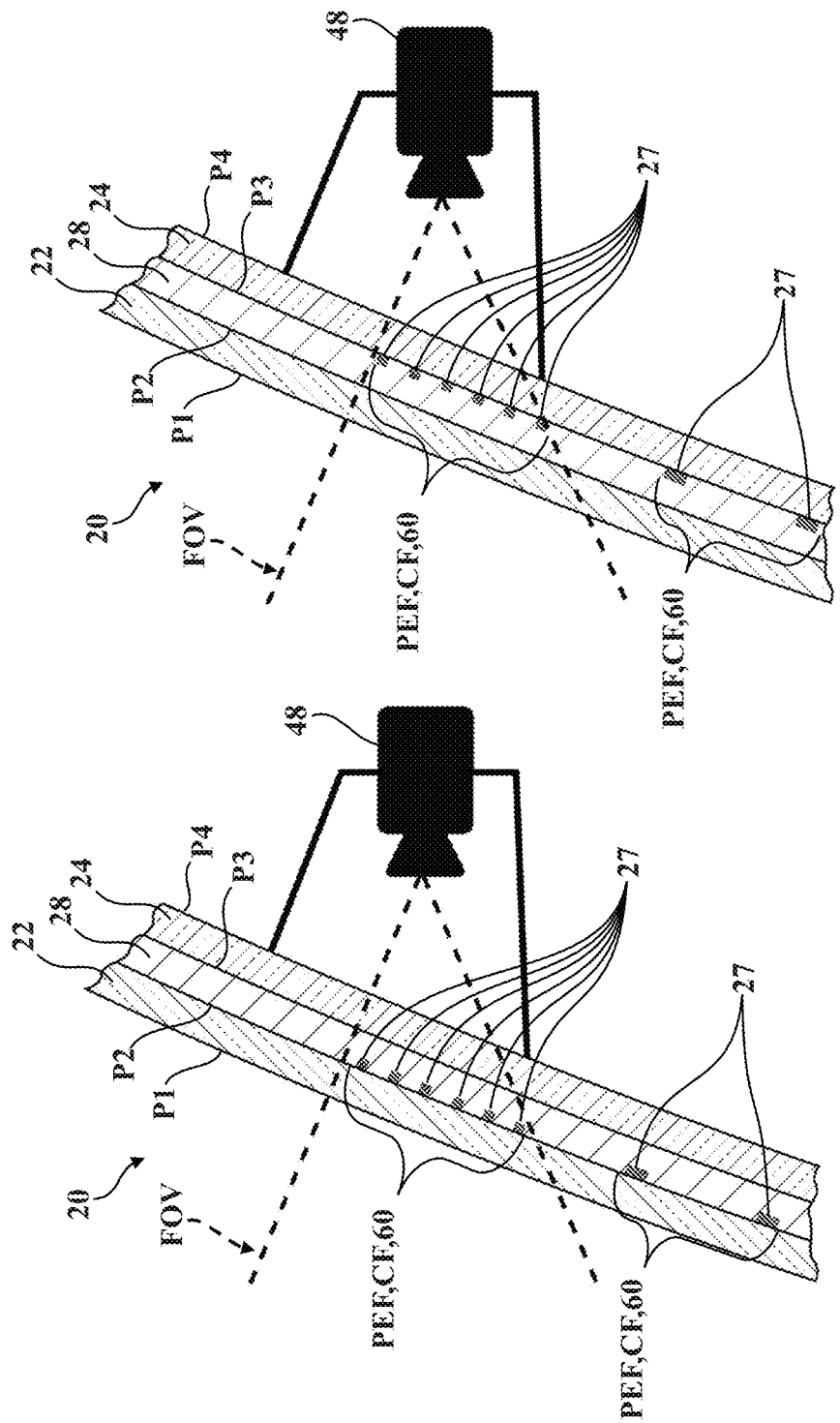
FIGS. 17A-17B are cross-sectional schematic representations of examples of the glass assembly of FIG. 16 taken along line 17-17.
Figure 18:
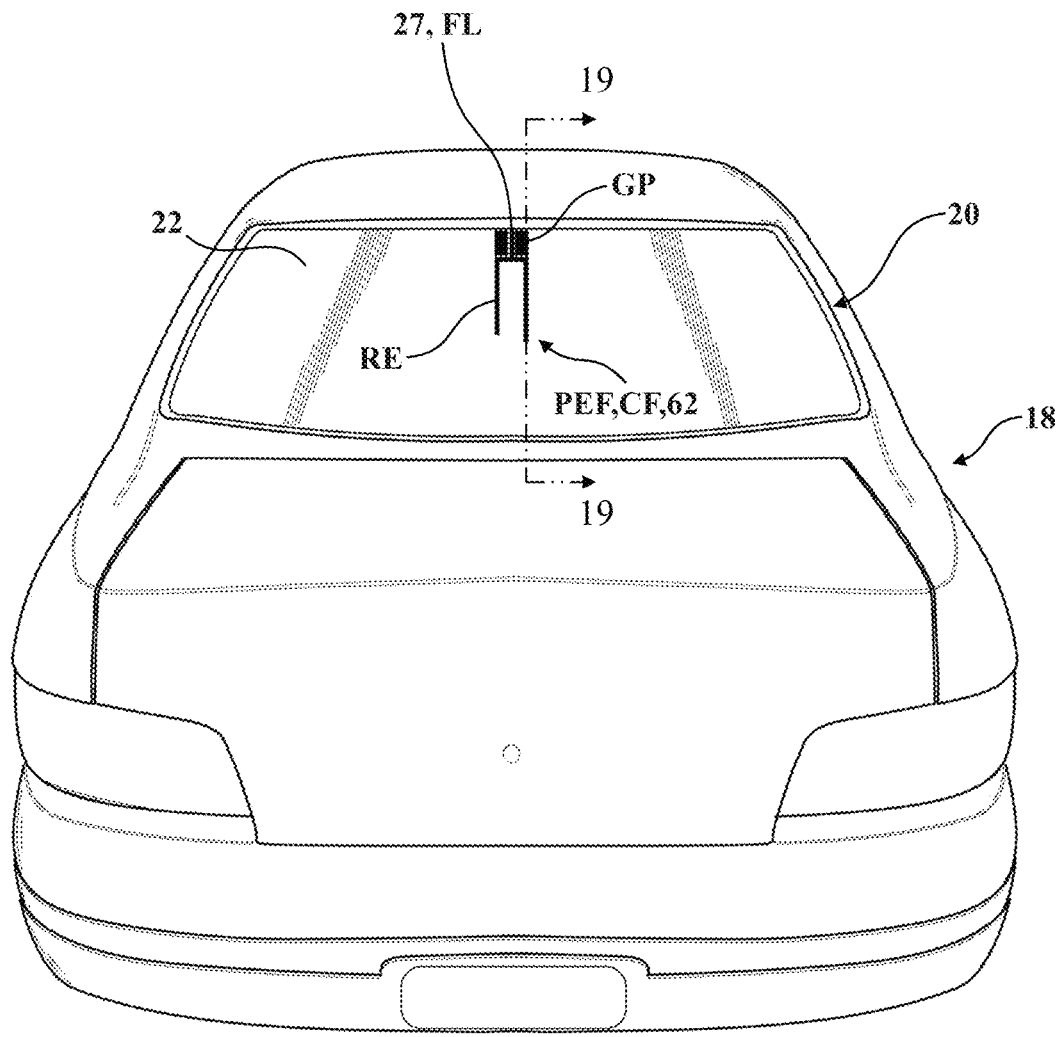
FIG. 18 is a rear perspective view of a vehicle including a rear glass assembly including a conductive feature defining an antenna.
Figures 19A, 19B, 19C:
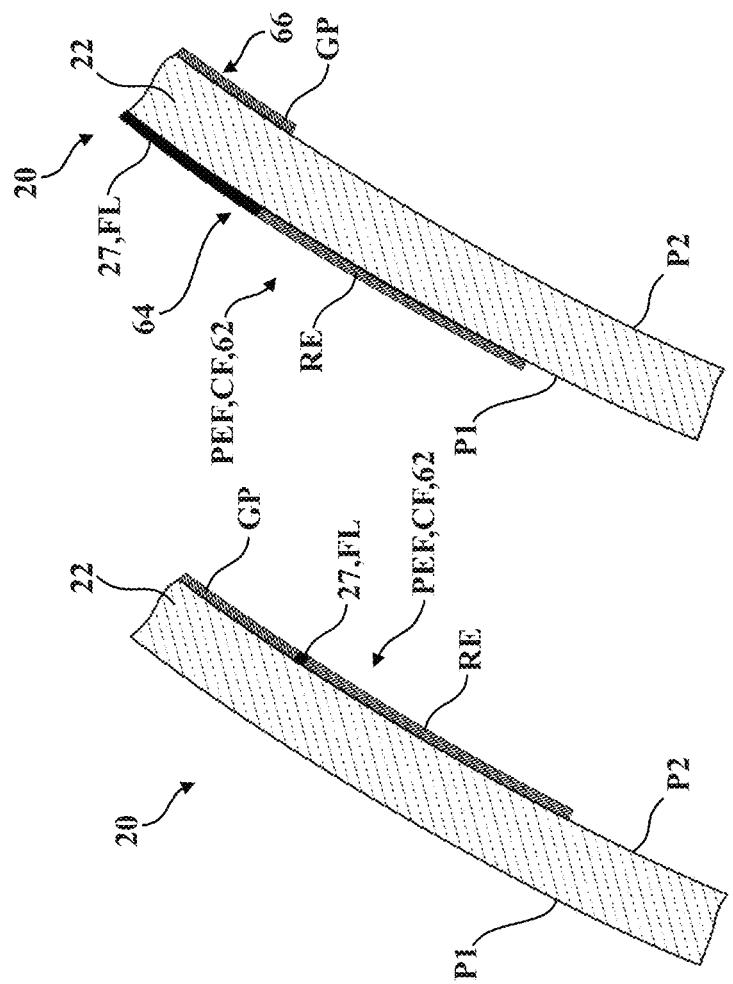
FIGS. 19A-19C are cross-sectional schematic representations of examples of the glass assembly of FIG. 18 taken along line 19-19.
Figure 20:
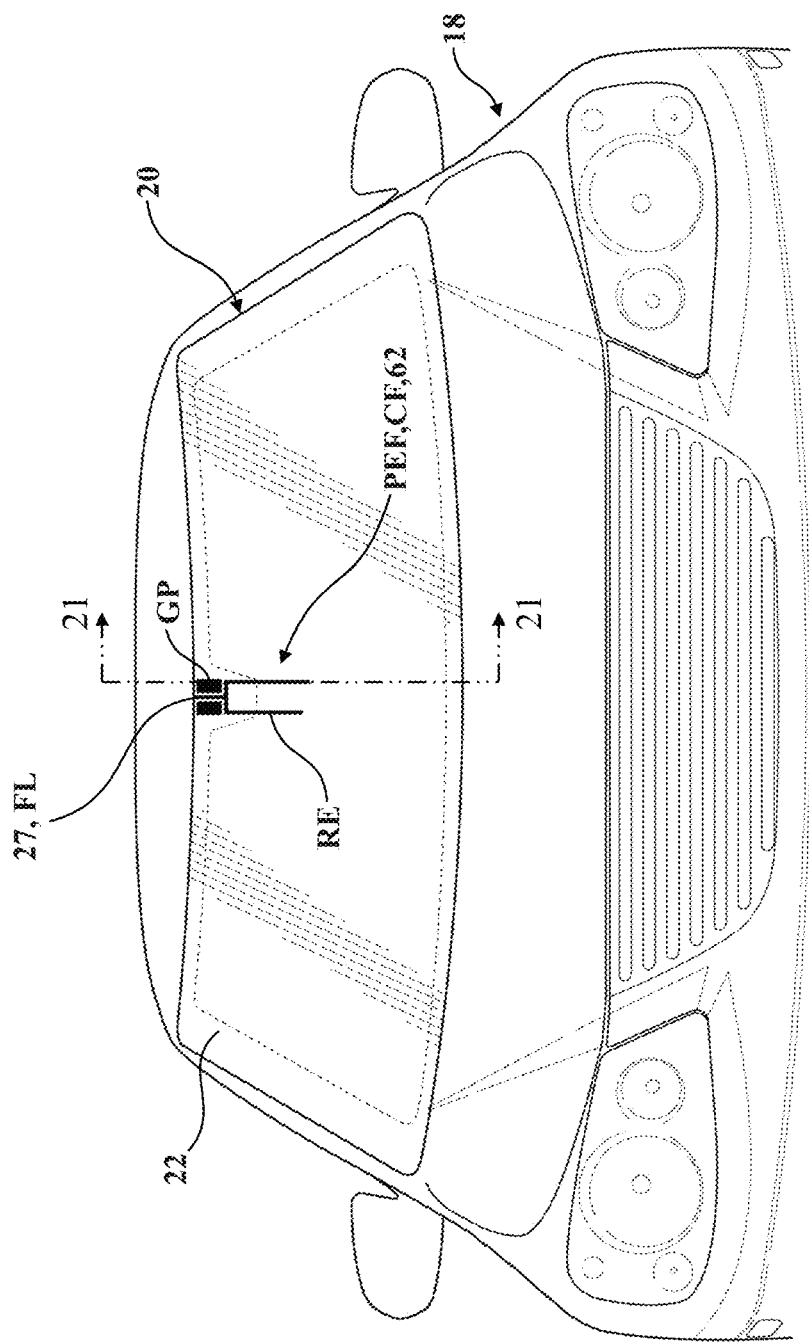
FIG. 20 is a front view of a vehicle including a front glass assembly including a conductive feature defining an antenna.
Figure 21:
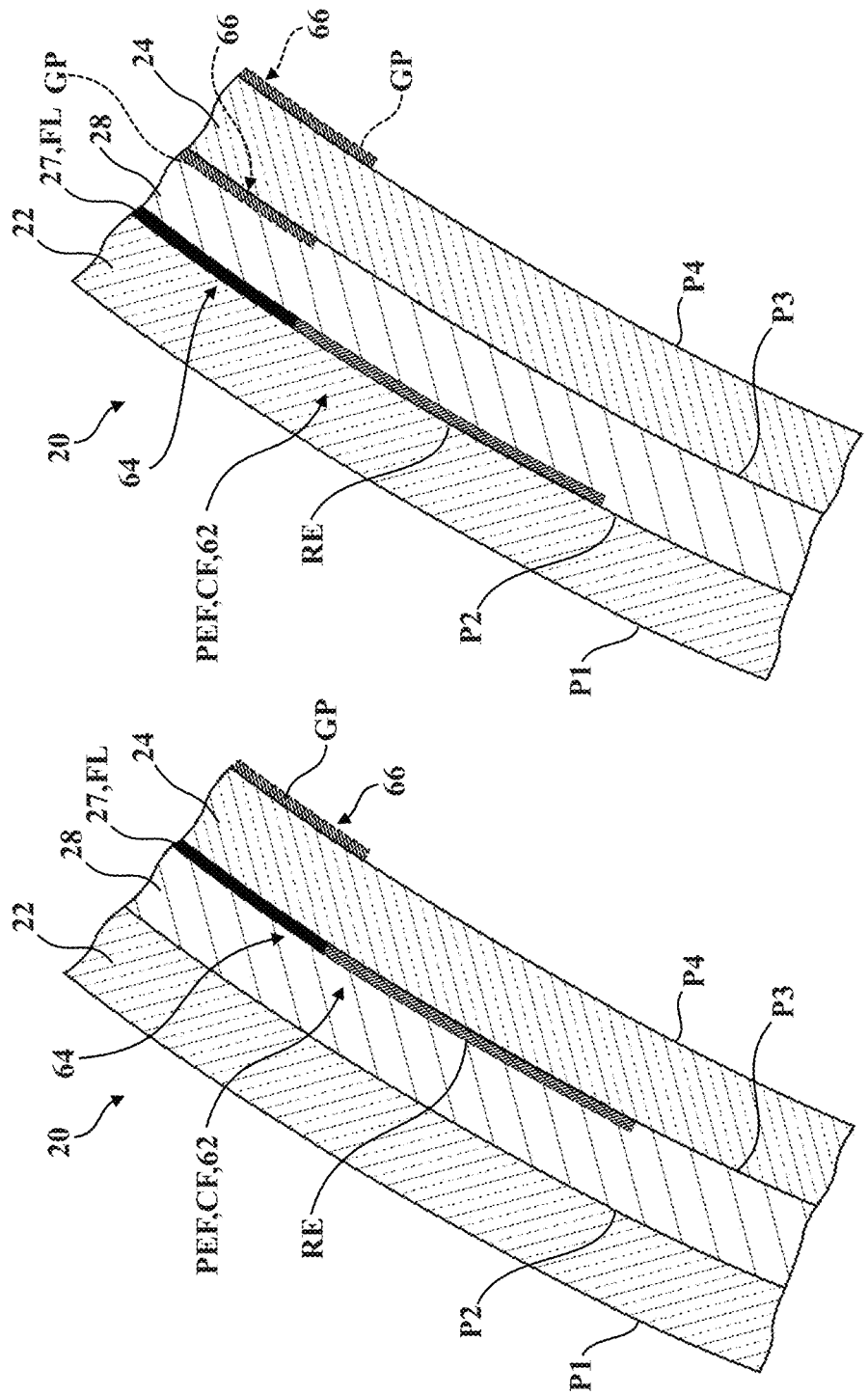
FIGS. 21A-21B are cross-sectional schematic representations of examples of the glass assembly of FIG. 20 taken along line 21-21.
Figure 22:
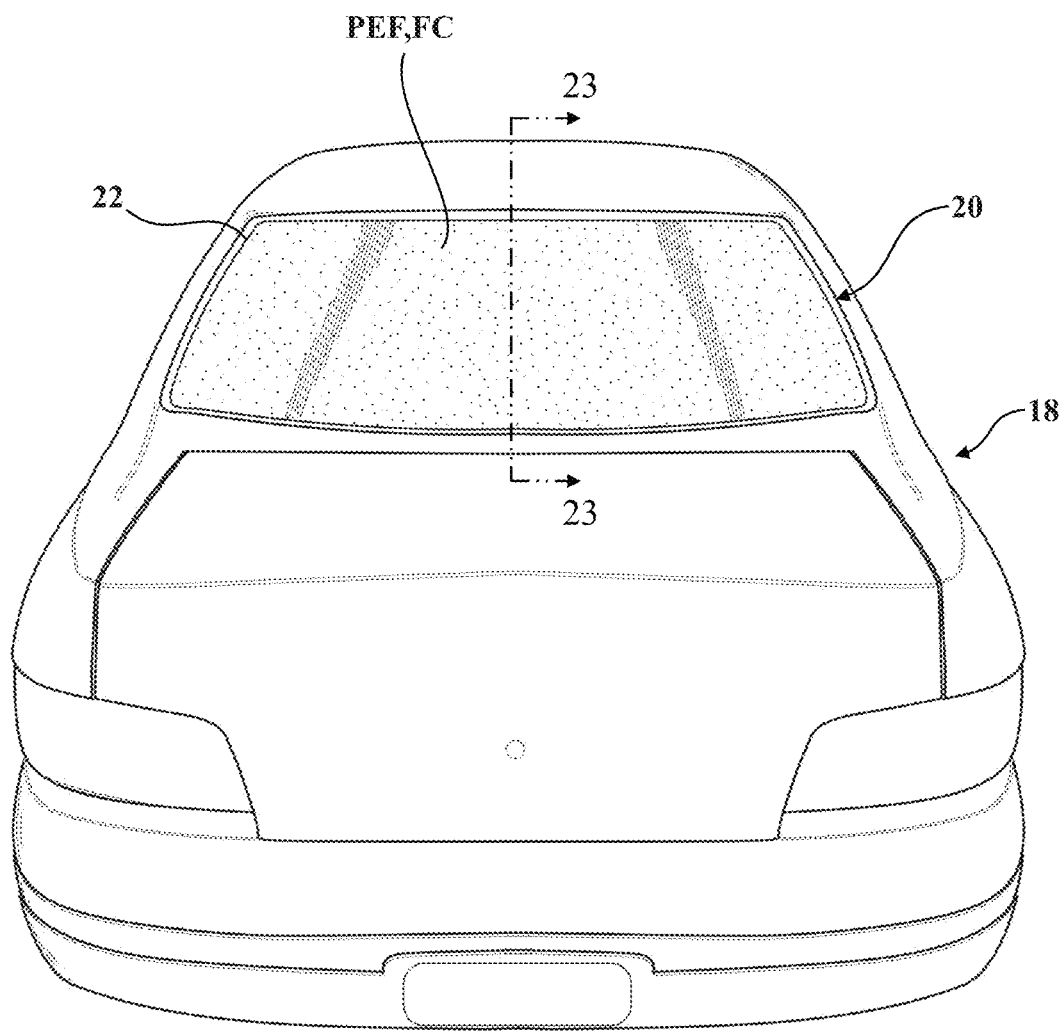
FIG. 22 is a rear perspective view of a vehicle including a rear glass assembly including a functional coating.
Figure 23B:
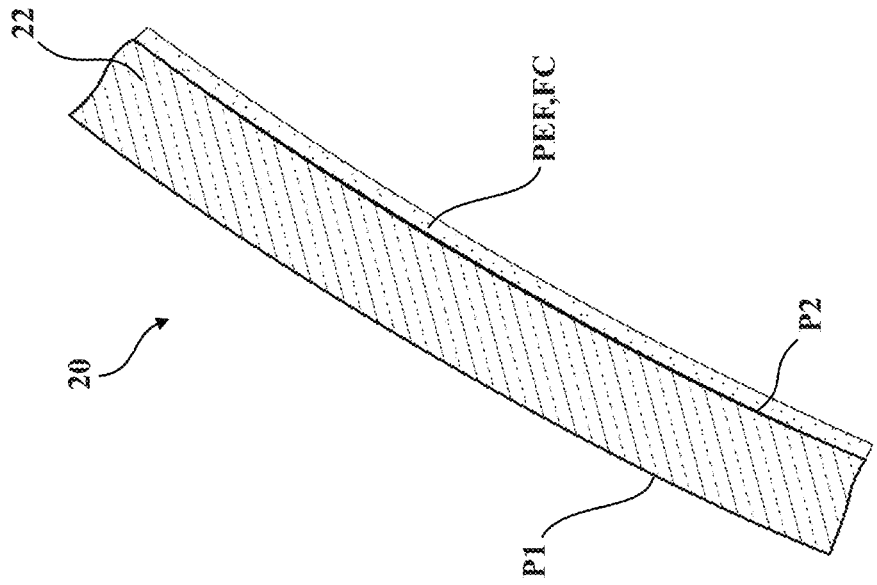
FIGS. 23A-23B are cross-sectional schematic representations of examples of the glass assembly of FIG. 22 taken along line 23-23.
Figure 23A:
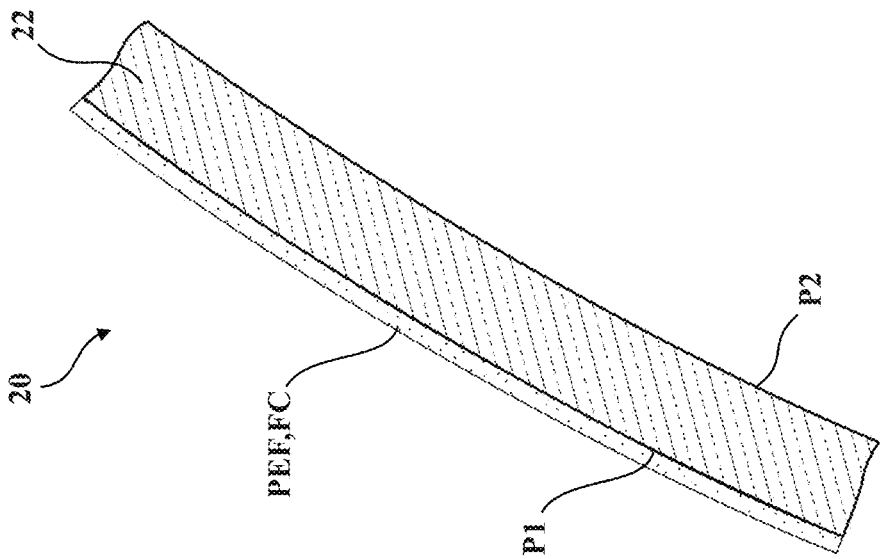

Referring now to FIGS. 14-21B, various examples of glass assemblies 20 including the conductive feature CF including the at least one conductive line 27 are illustrated. For example, FIGS. 14 and 18 show a vehicle 18 including a rear glass assembly 20 formed according to the method 100 to include the conductive feature CF including the at least one conductive line 27. FIGS. 16 and 20 show a vehicle 18 including a front glass assembly 20 formed according to the method 100 to include the conductive feature CF including the at least one conductive line 27.

Referring to FIGS. 14-17B, in some examples, the conductive feature CF including the at least one conductive line 27 defines a heating element 60 configured to be energized to heat (i.e., defrost and/or defog) at least a portion of the glass assembly 20. The heating element 60 may be formed according to the method 100 to have any suitable geometry that forms a circuit that is configured to be energized to heat (i.e., defrost and/or defog) at least a portion of the glass assembly 20. Suitable geometries for the heating element 60 include, but are not limited to, a meandering geometry, a grid geometry, a fan geometry, and a spiral geometry. The at least one conductive line 27 has a line width W (shown in FIG. 15A). Any suitable line width W for defining a heating element 60 is contemplated. It should be appreciated that the line width W of the at least one conductive line 27, as well as the conductive particle load of the conductive ink CI, may be adjusted to achieve a desired resistivity of the heating element 60. For example, the heating element 60 may have a resistivity of less than 10 microohms centimeter. Preferably, the heating element 60 may have a resistivity of less than 5 microohms centimeter.

FIG. 14 shows one example of a vehicle 18 including a rear glass assembly 20. The rear glass assembly 20 includes the conductive feature CF including the at least one conductive line 27 that defines the heating element 60 having a meandering geometry. In this example, the heating element 60 of FIG. 14 is defined by the conductive line 27. The conductive line 27 veers back and forth across the surface of the curved glass substrate 22 to form a circuit that is configured to be energized to heat (i.e., defrost and/or defog) at least a portion of the glass assembly 20. FIGS. show various examples of cross-sectional schematic representations of the glass assembly 20 of FIG. 14. More specifically, FIG. 15A shows the conductive feature CF including the conductive line 27 formed on the P1 surface of the curved glass substrate 22. FIG. 15B shows the conductive feature CF including the conductive line 27 formed on the P2 surface of the curved glass substrate 22. It should also be appreciated that in some examples, the conductive feature CF including the at least one conductive line 27 may be formed on both the P1 surface and the P2 surface of the curved glass substrate 22.

FIG. 16 shows another example of a vehicle 18 including a front glass assembly 20.

The front glass assembly 20 includes the conductive feature CF including the at least one conductive line 27 that defines the heating element 60 having a grid geometry. In this example, the heating element 60 is defined by of a plurality of conductive lines 27 that intersect to form a circuit that is configured to be energized to heat (i.e., defrost and/or defog) at least a portion of the glass assembly 20. FIGS. 17A and 17B show various examples of cross-sectional schematic representations of the glass assembly 20 of FIG. 16. Notably, in this example, the front glass assembly 20 is a laminated glass assembly 20. Accordingly, the glass assembly 20 includes the first curved glass substrate 22, the second curved glass substrate 24, and the polymeric interlayer 28.

As described above, in some examples it is advantageous to form the performance-enhancing feature PEF on at least one of the P2 surface and the P3 surface to protect the performance-enhancing feature PEF from the surrounding environment, Accordingly, in the example of FIG. 17A, the conductive feature CF is formed on the P2 surface of the first curved glass substrate 22. In the example of FIG. 17B, the conductive feature CF is formed on the P3 surface of the second curved glass substrate 24. Although FIGS. 17A and 17B show the conductive feature CF formed on the P2 surface and the P3 surface, it should be appreciated that the conductive feature CF may also be formed on the P1 surface and/or the P4 surface of the glass assembly 20.

With continued reference to FIGS. 16-17B, in some examples, glass assembly 20 may further include the optical sensor 48 mounted to the glass assembly 20. As described above, the optical sensor 48 has a field of view FOV (i.e., a limited angular range that the optical sensor 48 can "see" while stationary). Notably, frost or other condensation may obscure the field of view FOV and, therefore, hinder the performance of the optical sensor 48. Accordingly, in some examples, the glass assembly 20 includes another conductive feature CF including the at least one conductive line 27 that defines another heating element 60 that is aligned with the field of view FOV of the optical sensor 48 to heat (i.e., defrost and/or defog) at least a portion of the glass assembly 20 corresponding to the field of view FOV of the optical sensor 48. As described above, conductive features formed using conventional conductive substances tend to exhibit significant optical distortion of the glass assembly, which is particularly detrimental to the performance of optical sensors when the distortion is within the field of view FOV of the optical sensor. In the present disclosure, however, the conductive feature CF (e.g. heating element 60) is not subject to firing after printing, thereby substantially reducing the optical distortion of the glass assembly 20. Thus, advantageously, the optical distortion exhibited by a glass assembly 20 formed according to the method 100 is low enough to meet specifications required for optimal performance of optical sensors 48, such as a camera or a LIDAR sensor, as well as optical projecting devices, such as a heads-up-display. For example, a glass assembly 20 formed according to the method 100 may exhibit an optical distortion of less than 100 millidiopters within the field of view FOV of the optical sensor.

In the context of heating elements 60 that are aligned with the field of view FOV of the optical sensor 48, it is desirable that the at least one conductive line 27 defining the heating element 60 does not perceivably obscure the optical sensor 48 such that the performance of the optical sensor 48 is affected. Particularly, where the heating elements 60 are aligned with the field of view FOV of the optical sensor 48, it is advantageous to form the lines 27 of the conductive feature CF to have a line width W that is small enough to ensure that the lines 27 do not cause a "blind spot" in the vision of the optical sensor 48, and to minimize diffraction of light entering the optical sensor 48 caused by the lines 27. As described above, the higher resolution of the digital application process of step S2 enables the at least one conductive line 27 of the conductive feature CF to be formed with a significantly smaller line width W than possible with conventional analog printing processes. Accordingly, in one example, where the optical sensor 48 is a camera, the at least one conductive line 27 of the conductive feature CF may be formed to have a line width W of less than 100 micrometers. In another example, where the optical sensor is a LIDAR sensor, the at least one conductive line 27 of the conductive feature CF may be formed to have a smaller line width W of less than 65 micrometers.

Referring again to FIG. 16, another example of a conductive feature CF including at least one line 27 formed according to the method 100 is a bus bar 61. The bus bar 61 may be configured to transfer energy to another conductive feature CF (such as heating element 60) of the glass assembly 20. For example, a glass assembly 20 may be formed according to the method 100 to include a heating element 60. To supply power to the heating element 60, a bus bar 61 may be formed according to the method 100 to be in electrical communication with the heating element to supply the heating element 60 with power. Any suitable geometry (e.g. line width W) and location of the bus bar 61 relative to the other conductive feature CF is contemplated. Additionally, bus bars 61 for supplying other conductive features CF beyond heating elements 60 with power are contemplated.

Referring to FIGS. 18-21B, in other examples, the conductive feature CF including the at least one conductive line 27 defines an antenna 62 configured to transmit and/or receive radio signals. In some examples, the antenna 62 may be configured to transmit and/or receive radio signals having a frequency of from 540 kilohertz to 6 gigahertz. Accordingly, the antenna 62 may be configured to transmit and/or receive radio signals within any of a number of standard frequencies including, but not limited to, amplitude modulation (AM), frequency modulation (FM), Digital Audio Broadcasting (DAB), Remote Keyless Entry (RKE), Digital television (DTV), Global Positioning System (GPS), 2G cellular, 3G cellular, 4G cellular, and some 5G cellular frequencies (more specifically, low-band and mid-band 5G cellular frequencies that are less than 6 gigahertz).

The antenna 62 may be formed according to the method 100 to have any suitable structure for transmitting and/or receiving radio signals having a frequency of from 540 kilohertz to 6 gigahertz. Examples of suitable antenna structures for the antenna 62 include, but are not limited to, various configurations of planar antennas, such as planar monopole antennas, planar dipole antennas, patch antennas, slot antennas, vivaldi antennas, planar conical antennas, planar bulbous antennas, planar horn antennas, and the like. It should be appreciated that the at least one conductive line 27 of the conductive feature may define a portion or an entirety of the antenna 62. For example, the at least one conductive line 27 may define one or more of a feed line FL, a radiating element RE, and a ground plane GP. In examples where a portion of the antenna 62 has a non-linear structure (e.g. a patch antenna), a plurality of conductive lines 27 may be digitally applied and cured adjacent to each other to define the portion of the antenna 62 having a non-linear structure.

Forming the antenna 62 according to the method 100 is advantageous in a variety of aspects. In one aspect, as described above, the higher resolution of the digital application process of step S2 allows the conductive ink CI to be deposited with significantly tighter tolerances than conventional analog printing processes. For example, using a conventional analog printing process, such as screen printing, the conductive feature may only be able to be repeatably located within a +/−1.5 millimeter tolerance. However, due to the precise control of the digital application process of step S2, the conductive feature CF including the at least one conductive line 27 defining an antenna 62 may be able to be repeatably located within less than a +/−0.1 millimeter tolerance.

In another aspect, as also described above, the higher resolution of the digital application process of step S2 allows the conductive ink CI to be deposited to form significantly more detailed features than conventional analog printing processes. For example, using a conventional analog screen printing process, such as screen printing, the conductive feature may only be able to be deposited at a width W of 113 micrometers. However, due to the increased accuracy and precision of the digital application process of step S2, antennas 62 formed according to the method 100 may have significantly more detailed features than antennas formed using conventional analog printing processes. For example, the conductive feature CF including the at least one conductive line 27 defining an antenna 62 may be formed have a width W of less than 100 micrometers, or even as low as 10 micrometers. Additionally, due to the more detailed features, the antennas 62 of the present disclosure may be capable of transmitting and/or receiving radio signals at higher frequency and/or having a higher bandwidth than antennas formed using conventional analog printing processes. As an example, the antennas 62 of the present disclosure may include small "tuning stub" features that extend from the antenna 62 to improve the bandwidth of the antenna 62.

FIG. 18 shows one example of a vehicle 18 including a rear glass assembly 20 that has been formed according to the method 100 to have the conductive feature CF including at least one conductive line 27 defining the antenna 62 configured to transmit and/or receive radio signals. In this example, the antenna 62 includes a feed line FL coupled to a radiating element RE, and a ground plane GP arranged adjacent to the feed line FL and the radiating element RE. Although FIG. 18 shows one potential structure of the antenna 62, it should be appreciated that any suitable antenna structure is contemplated. FIGS. 19A-19C show various examples of cross-sectional schematic representations of the glass assembly 20 of FIG. 18. In the example of FIG. 19A, the antenna 62 is formed on the P1 surface of the curved glass substrate 22 such that the feed line FL, radiating element RE and the ground plane GP are all arranged on the P1 surface. In the example of FIG. 19B, the antenna 62 is formed on the P2 surface of the curved glass substrate 22 such that the feed line FL, the radiating element RE and the ground plane GP are all arranged on the P2 surface. In other examples, the antenna 62 may be formed as a multi-planar antenna. For example, referring to FIG. 19C, the glass assembly 20 may include a first portion 64 of the antenna 62 (in this example, the feed line FL and the radiating element RE) on the P1 surface of the curved glass substrate 22 and a second portion 66 of the antenna (in this example, the ground plane GP) on the P2 surface of the curved glass substrate 22. Any suitable multi-planar antenna configuration is contemplated.

Where the glass assembly 20 is formed as a laminated glass assembly 20, the conductive feature CF including the at least one conductive line 27 defining the antenna 62 may include the first antenna portion 64 formed on one of the P1 surface, the P2 surface, the P3 surface, and the P4 surface and the second antenna portion 66 formed on another of the P1 surface, the P2 surface, the P3 surface, and the P4 surface. Advantageously, the tighter tolerances afforded by digitally-applying the conductive ink CI according to step S2 of the method 100 enable improved alignment of the first antenna portion 66 and the second antenna portion 66, thereby improving the electrical communication between the first antenna portion 64 and the second antenna portion 66 and, thus, improving the performance of the antenna 62.

Additionally, as described above, in the context of laminated glass assemblies 20, it is advantageous to digitally apply the conductive ink CI on at least one of the P2 surface of the first curved glass substrate 22 and the P3 surface of the second curved glass substrate 24 such that, upon lamination of the glass assembly 20, the conductive feature CF is sandwiched within the glass assembly 20. Accordingly, in some examples, the first antenna portion 64 is formed on one of the P2 surface and the P3 surface, and the second antenna portion 66 is formed on one of the P1 surface, the P2 surface, the P3 surface, and the P4 surface such that at least one of the first antenna portion 64 and the second antenna portion 66 are sandwiched within the glass assembly 20. In some examples, the second antenna portion 66 is formed on a different surface than the first antenna portion 64. However, it is contemplated that in other examples, the second antenna portion 66 is formed on the same surface as the first antenna portion 64. FIGS. 19C and 21A-21B illustrate examples of the second antenna portion 66 formed on a different surface than the first antenna portion 64.

FIG. 20 illustrates a vehicle 18 including a front glass assembly 20 formed according to the method 100 to have the conductive feature CF including the at least one conductive line 27 defining an antenna 62 configured to transmit and/or receive radio signals. Similar to the example of FIG. 18, the antenna 62 of FIG. 20 includes a feed line FL coupled to a radiating element RE, and a ground plane GP arranged adjacent to the feed line FL and the radiating element RE. FIGS. 21A-21B show various examples of cross-sectional schematic representations of the glass assembly 20 of FIG. 20. In the example of FIG. 21A, the glass assembly 20 includes a first portion 64 of the antenna 62 (in this example, the feed line FL and the radiating element RE) on the P3 surface of the second curved glass substrate 24 and a second portion 66 of the antenna 62 (in this example, the ground plane GP) on the P4 surface of the second curved glass substrate 24. In the example of FIG. 21B, the glass assembly 20 includes a first portion 64 of the antenna 62 (in this example, the feed line FL and the radiating element RE) on the P2 surface of the first curved glass substrate 22 and a second portion 66 of the antenna 62 (in this example, the ground plane GP) on one of the P3 surface and the P4 surface of the second curved glass substrate 24 (these alternative arrangements of the second antenna portion 66 are illustrated with phantom outlines). Although FIGS. 21A and 21B show example arrangements where the ground plane GP is arranged closer to the interior of the vehicle 18, it should be appreciated that the first antenna portion 64 and the second antenna portion 66 may be independently formed on any of the P1 surface, the P2 surface, the P3 surface, and the P4 surface to form a suitable antenna 62.

Figure 24:
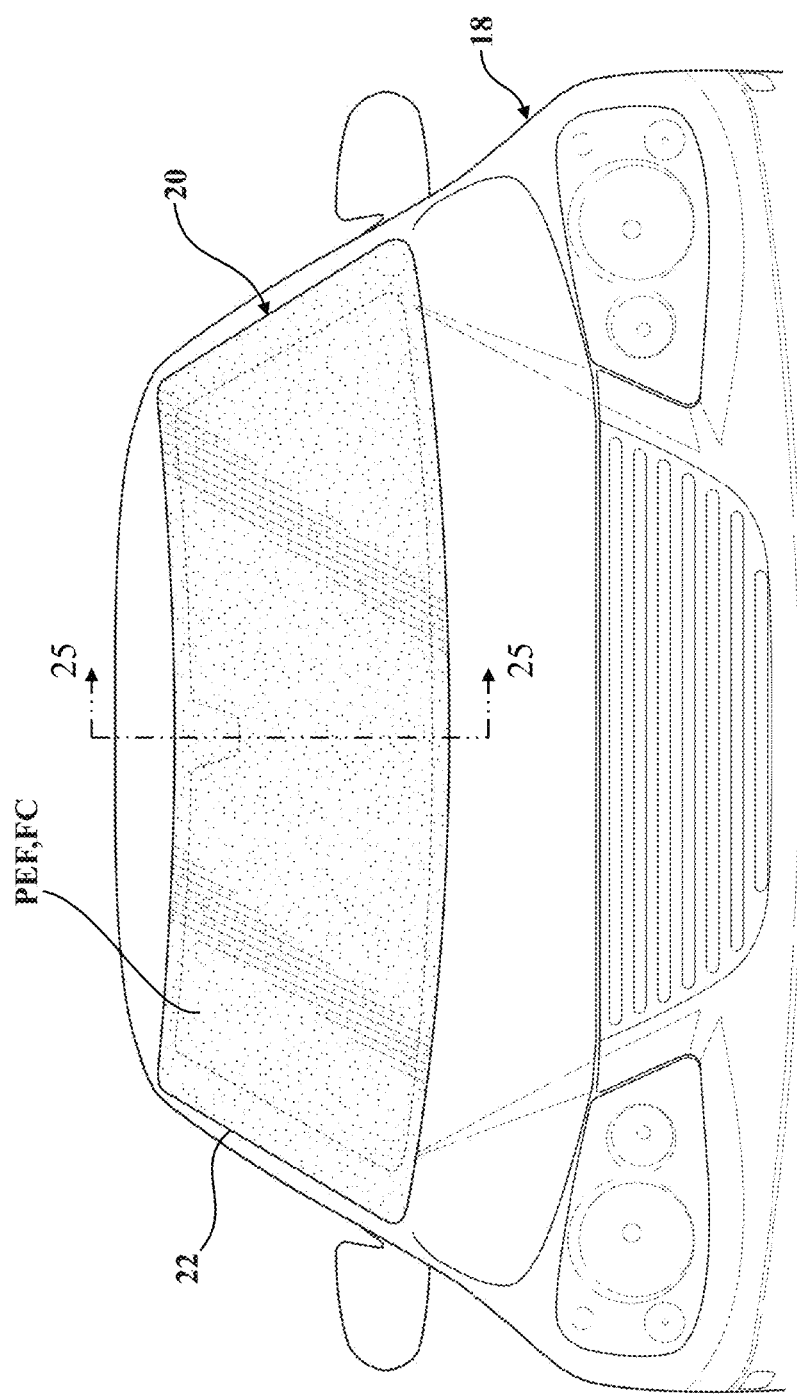
FIG. 24 is a front view of a vehicle including a front glass assembly including a functional coating.

In examples where the ink I is a functional ink FI, the performance-enhancing feature PEF may be formed as a functional coating FC. The functional ink FI may comprise an anti-reflective coating, an IR transparent coating, a hydrophobic coating, an oleophobic coating, or an oleophilic coating. The functional coating FC may be formed on at least a portion of a surface of the glass assembly (such as aligned with the sensing window 46) or formed over an entire surface of the glass assembly 20. FIG. 24 shows a glass assembly 20 formed according to the method 100 to include the functional coating FC. In the example of FIG. 24, the functional coating FC is formed over an entire surface of the glass assembly 20. It is contemplated that the functional coating FC may be formed on at least one of the P1 surface, the P2 surface, and, in the case of laminated glass assemblies 20, the P3 surface and the P4 surface. FIGS. 24-25B show cross-sectional representations of various examples of glass assemblies 20 including the functional coating FC.

Figure 25A:
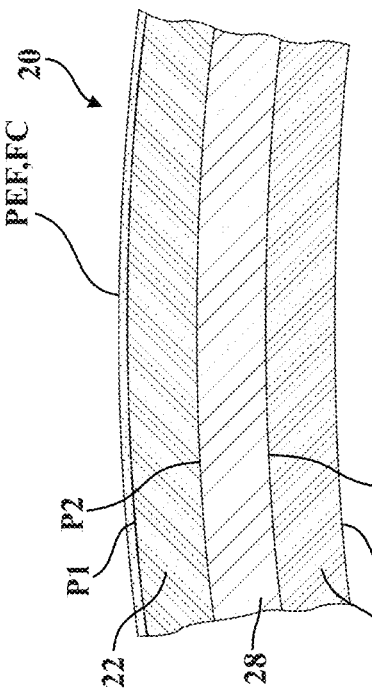
FIGS. 25A-25D are cross-sectional schematic representations of examples of the glass assembly of FIG. 24 taken along line 25-25.
Figure 25B:
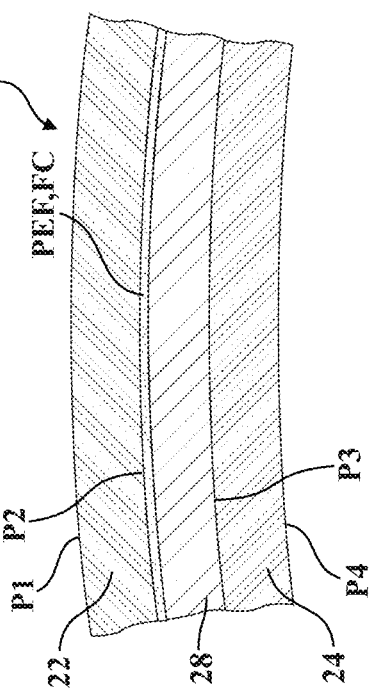
Figure 25C:
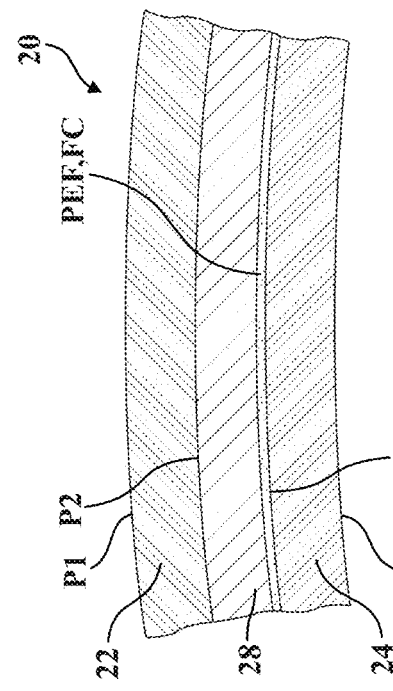
Figure 25D:
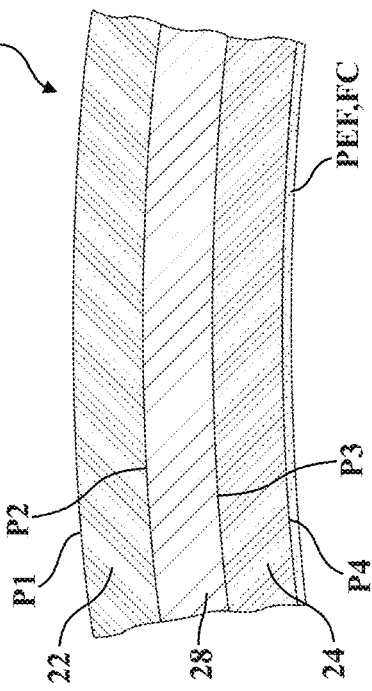

In the example shown in FIG. 25A, the glass assembly 20 includes the first curved glass substrate 22, the functional coating FC formed on the P1 surface of the first curved glass substrate 22, the second curved glass substrate 24, and the polymeric interlayer 28 disposed between the P2 surface and the P3 surface. In the example shown in FIG. 25B, the glass assembly 20 includes the first curved glass substrate 22, the functional coating FC formed on the P2 surface of the first curved glass substrate 22, the second curved glass substrate 24, and the polymeric interlayer 28 disposed between the P2 surface and the P3 surface. In the example shown in FIG. 25C, the glass assembly 20 includes the first curved glass substrate 22, the second curved glass substrate 24, the functional coating FC formed on the P3 surface of the second curved glass substrate 24, and the polymeric interlayer 28 disposed between the P2 surface and the P3 surface. In the example shown in FIG. 25D, the glass assembly 20 includes the first curved glass substrate 22, the second curved glass substrate 24, functional coating FC formed on the P4 surface of the second curved glass substrate 24, and the polymeric interlayer 28 disposed between the P2 surface and the P3 surface. Although FIGS. 25A-25D show the functional coating FC formed on the P1 surface, the P2 surface, the P3 surface, and the P4 surface of a laminated glass assembly 20 individually, it is contemplated that a plurality of functional coatings FC may be formed on any combination of the P1 surface, the P2 surface, the P3 surface, and the P4 surface. Of laminated glass assemblies 20, or on at least one of the P1 surface and P2 surface of a glass assembly 20 including only the first curved glass substrate 22.

Several embodiments have been described in the foregoing description. However, the embodiments described herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular. It will be further appreciated that the terms "include," "includes," and "including" have the same meaning as the terms "comprise," "comprises," and "comprising."

What is claimed is:

1. A method of manufacturing a glass assembly to have a performance-enhancing feature (PEF), said method comprising:
    forming a first glass substrate that is curved, with the first glass substrate having an outer surface (P1) and an opposing inner surface (P2);
    forming a second glass substrate that is curved, with the second glass substrate having an inner surface (P3) and an opposing outer surface (P4);

digitally-applying an ink without a mask onto at least one of the P1 surface, the P2 surface, the P3 surface, and the P4 surface;

curing the ink to form the PEF on the at least one of the P1 asurface, the P2 surface, the P3 surface, and the P4 surface; and disposing a polymeric interlayer between the P2 surface of the first glass substrate and the P3 surface of the second glass substrate.

2. The method of claim 1, wherein the ink has a thermal degradation temperature, and wherein said step of curing the ink to form the PEF occurs below the thermal degradation temperature of the ink.

3. The method of claim 1, wherein said step of curing the ink to form the PEF comprises photo-curing the ink with a UV curing device.

4. The method of claim 3, wherein the ink includes a photoinitiator and an organic monomer; and
wherein said step of curing the ink to form the PEF comprises exposing the ink to the UV curing device to activate the photoinitiator to initiate polymerization of the organic monomer to cure the ink.

5. The method of claim 3, wherein the UV curing device is a UV light emitting diode that emits UV light having a wavelength of 315 nanometers to 400 nanometers.

6. The method of claim 1, wherein said step of curing the ink is initiated within 5 seconds after said step of digitally-applying the ink.

7. The method of claim 1, wherein said step of digitally-applying the ink further comprises digitally-applying the ink at a resolution of greater than 400 dots per inch.

8. The method of claim 1, wherein said step of digitally-applying the ink further comprises inkjet-printing the ink.

9. The method of claim 1, wherein the PEF has a resolution of greater than 200 dots per inch.

10. The method of claim 1, further comprising providing a robotic applicator including a printhead and a curing device, and positioning the robotic applicator adjacent to the at least one of the P1 surface, the P2 surface, the P3 surface, and the P4 surface;
wherein said step of digitally-applying the ink comprises digitally-applying the ink from the printhead of the robotic applicator without a mask on the at least one of the P1 surface, the P2 surface, the P3 surface, and the P4 surface as the robotic applicator moves along the at least one of the P1 surface, the P2 surface, the P3 surface, and the P4 surface; and
wherein said step of curing the ink to form the PEF comprises activating the curing device of the robotic applicator to cure the digitally applied ink as the robotic applicator moves along the at least one of the P1 surface, the P2 surface, the P3 surface, and the P4 surface to form the PEF on the at least one of the P1 surface, the P2 surface, the P3 surface, and the P4 surface.

11. The method of claim 10, wherein the curing device is a UV curing device, and wherein said step of activating the curing device of the robotic applicator to cure the digitally applied ink to form the PEF comprises:
activating the UV curing device to photo-cure the digitally applied ink as the robotic applicator moves along the at least one of the P1 surface, the P2 surface, the P3 surface, and the P4 surface.

12. The method of claim 1, wherein the PEF has a thickness of less than 15 micrometers on the at least one of the P1 surface, the P2 surface, the P3 surface, and the P4 surface.

13. The method of claim 1, wherein said step of digitally-applying the ink comprises digitally-applying an organic ink.

14. The method of claim 13, wherein the PEF is an opaque boundary feature arranged adjacent to a peripheral edge of the glass assembly.

15. The method of claim 1, wherein said step of digitally-applying the ink comprises digitally-applying a conductive ink.

16. The method of claim 15, wherein the PEF is a conductive feature including at least one conductive line defining at least one of:
(i) a heating element configured to be energized to heat at least a portion of the glass assembly,
(ii) a bus bar configured to transfer energy to a conductive feature of the glass assembly, and
(iii) an antenna configured to transmit and/or receive radio signals.

17. The method of claim 1, wherein the PEF is a functional coating formed on at least a portion of the glass assembly, wherein said step of digitally-applying the ink comprises digitally-applying a functional ink without a mask onto the at least one of the P1 surface, the P2 surface, the P3 surface, and the P4 surface, wherein the functional ink is selected from a group consisting of an anti-reflective coating, an IR transparent coating, a hydrophobic coating, an oleophobic coating, and an oleophilic coating.

18. A glass assembly formed by the method of claim 1.

19. A method of manufacturing a glass assembly to have a performance-enhancing feature (PEF), said method comprising:
forming a glass substrate that is curved;
providing a robotic applicator including a printhead;
positioning the robotic applicator adjacent to a surface of the curved glass substrate;
digitally-applying an ink from the printhead of the robotic applicator without a mask on the surface of the curved glass substrate as the robotic applicator moves along the surface of the curved glass substrate; and
curing the ink to form the PEF on the surface of the curved glass substrate.

20. The method of claim 19, wherein the robotic applicator further includes a curing device, and wherein said step of curing the ink to form the PEF comprises activating the curing device of the robotic applicator to cure the digitally applied ink as the robotic applicator moves along the surface of the curved glass substrate to form the PEF on the surface of the curved glass substrate.

21. The method of claim 20, wherein the curing device is a UV curing device, and wherein said step of activating the curing device of the robotic applicator to cure the digitally applied ink to form the PEF comprises:
activating the UV curing device to photo-cure the digitally applied ink as the robotic applicator moves along the surface of the curved glass substrate.

22. The method of claim 21, wherein the ink includes a photoinitiator and an organic monomer; and
wherein said step of curing the ink to form the PEF comprises exposing the ink to the UV curing device to activate the photoinitiator to initiate polymerization of the organic monomer to cure the ink.

23. The method of claim 19, wherein said step of curing the ink is initiated within 5 seconds after said step of digitally-applying the ink.

24. The method of claim 19, wherein said step of digitally-applying the ink further comprises digitally-applying the ink at a resolution of greater than 400 dots per inch.

25. The method of claim 19, wherein the PEF has a thickness of less than 15 micrometers on the surface of the curved glass substrate.

26. The method of claim 19, wherein said step of digitally-applying the ink comprises digitally-applying an organic ink.

27. The method of claim 26, wherein the PEF is an opaque boundary feature arranged adjacent to a peripheral edge of the glass assembly.

28. The method of claim 19, wherein said step of digitally-applying the ink comprises digitally-applying a conductive ink.

29. The method of claim 28, wherein the PEF is a conductive feature including at least one conductive line defining at least one of:
   (i) a heating element configured to be energized to heat at least a portion of the glass assembly,
   (ii) a bus bar configured to transfer energy to a conductive feature of the glass assembly, and
   (iii) an antenna configured to transmit and/or receive radio signals.

30. The method of claim 19, wherein the PEF is a functional coating formed on at least a portion of the glass assembly, wherein said step of digitally-applying the ink comprises digitally-applying a functional ink without a mask onto a surface of the curved glass substrate, wherein the functional ink is selected from a group consisting of an anti-reflective coating, an IR transparent coating, a hydrophobic coating, an oleophobic coating, and an oleophilic coating.

* * * * *